United States Patent
Koeplinger et al.

(10) Patent No.: US 11,645,057 B2
(45) Date of Patent: *May 9, 2023

(54) SYSTEMS AND METHODS FOR MEMORY LAYOUT DETERMINATION AND CONFLICT RESOLUTION

(71) Applicant: SambaNova Systems, Inc., Palo Alto, CA (US)

(72) Inventors: David Alan Koeplinger, Menlo Park, CA (US); Weiwei Chen, Mountain View, CA (US); Kevin James Brown, Belmont, CA (US); Xiaoming Gu, Campbell, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/031,679

(22) Filed: Sep. 24, 2020

(65) Prior Publication Data
US 2022/0092247 A1    Mar. 24, 2022

(51) Int. Cl.
*G06F 8/41* (2018.01)
*G06F 12/0842* (2016.01)

(52) U.S. Cl.
CPC .............. *G06F 8/443* (2013.01); *G06F 8/433* (2013.01); *G06F 12/0842* (2013.01)

(58) Field of Classification Search
CPC ....... G06F 8/443; G06F 8/433; G06F 12/0842
(Continued)

(56) References Cited

U.S. PATENT DOCUMENTS 9,063,668 B1 *   6/2015   Jung ..................... G06F 12/023
10,970,217 B1 *   4/2021   Dastidar ............. G06F 12/0831
(Continued)

FOREIGN PATENT DOCUMENTS

WO   2010142987 A1   12/2010
WO   2019202216 A2   10/2019

OTHER PUBLICATIONS

Title: High performance tensor-vector multiplies on shared memory systems; author: F Pawlowski, published on 2019.*
(Continued)

*Primary Examiner* — Chameli Das
(74) *Attorney, Agent, or Firm* — Flagship Patents; Sikander Khan; Bruce Young

(57) ABSTRACT

A dataflow graph has operation units that are configured to be producer operation units to produce tensors for execution of the application, and to be consumer operation units to consume the tensors for execution of the application. Compile time logic is configured to process the dataflow graph to determine, for the tensors, expected producer memory layouts, expected consumer memory layouts, and current memory layouts. The expected producer memory layouts specify memory layouts required by the producer operation units that produce the tensors. The expected consumer memory layouts specify the memory layouts required by the consumer operation units that consume the tensors. The current memory layouts specify the memory layouts of the tensors. Each of the memory layouts includes a vector dimension and at least one of a vector ordering and a data alignment.

21 Claims, 36 Drawing Sheets
(16 of 36 Drawing Sheet(s) Filed in Color)

(58) Field of Classification Search
USPC .......................................................... 717/155
See application file for complete search history.

(56) References Cited

U.S. PATENT DOCUMENTS

| | | | |
|---|---|---|---|
| 2014/0085318 A1* | 3/2014 | Nadar | G01R 33/5608 345/502 |
| 2018/0204117 A1 | 7/2018 | Brevdo | |
| 2018/0210730 A1 | 7/2018 | Sankaralingam et al. | |
| 2018/0212894 A1 | 7/2018 | Nicol et al. | |
| 2018/0300181 A1 | 10/2018 | Hetzel et al. | |
| 2019/0130269 A1 | 5/2019 | Nicol | |
| 2019/0229996 A1 | 7/2019 | ChoFleming, Jr. et al. | |
| 2019/0392296 A1 | 12/2019 | Brady et al. | |
| 2020/0005155 A1 | 1/2020 | Datta et al. | |
| 2020/0034306 A1 | 1/2020 | Luo et al. | |
| 2020/0142743 A1* | 5/2020 | Zhang | G06T 1/20 |
| 2021/0192314 A1* | 6/2021 | Aarts | G06N 3/105 |

OTHER PUBLICATIONS

Title: A Memory Layout for Dynamically Routed Capsule Layers; author: DA Lopez, Published on 2019.*

PCT/US2021/051305—International Search Report and Written Opinion, dated Jan. 11, 2022, 16 pages.

Rotem et al., Glow: Graph Lowering Compiler Techniques for Neural Networks, Cornell University Library, New York, dated May 2, 2018, 12 pages.

PCT/US2021/035305—International Search Report and Written Opinion dated Sep. 1, 2021, 17 pages.

Podobas et al., A Survey on Coarse-Grained Reconfigurable Architectures From a Performance Perspective, IEEEAccess, vol. 2020. 3012084, Jul. 27, 2020, 25 pages.

M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.

Prabhakar, Design of Programmable, Energy-Efficient Reconfigurable Accelerators, Stanford University, dated Aug. 2018, 104 pages.

Jung, Optimization of the Memory Subsystem of a Coarse Grained Reconfigurable Hardware Accelerator, Technical University at Darmstadt, dated 2019, 184 pages.

Prabhakar et al., "Plasticine: A Reconfigurable Architecture for Parallel Patterns", ISCA '17, Jun. 24-28, 2017, Toronto, ON, Canada.

Koeplinger et al., Spatial: A Language and Compiler for Application Accelerators, Proceedings of the 39th ACM SIGPLAN Conference on Programming Language Design and Embodiment (PLDI), Proceedings of the 43rd International Symposium on Computer Architecture, 2018.

IEEE search results, Year: 2021, 7 pages.

U.S. Appl. No. 17/023,015—Notice of Allowance dated Sep. 30, 2021, 9 pages.

PCT/US2021/050586—International Search Report and Written Opinion, dated Jan. 18, 2022, 16 pages.

* cited by examiner

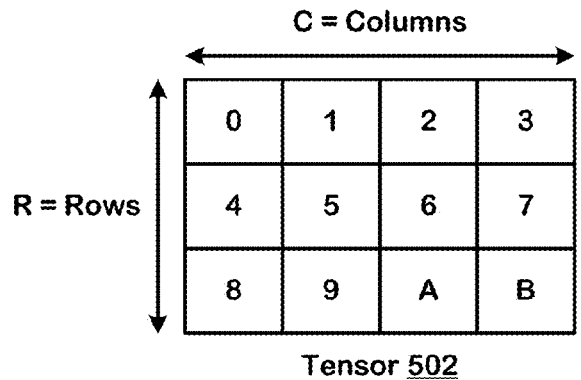
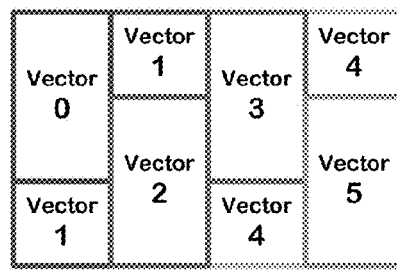
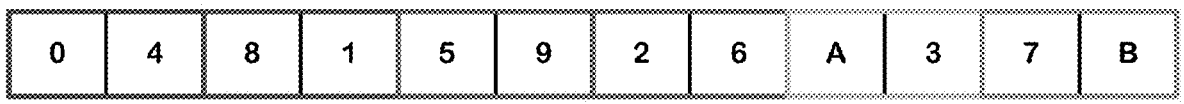
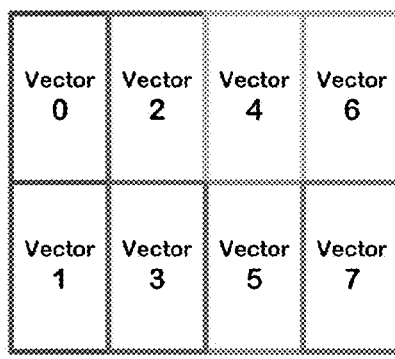
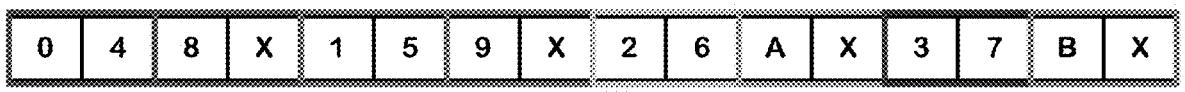
FIG. 5

Memory Layout Functions 700A

E[v] = Expected Consumer Memory Layout 702
P[v] = Expected Producer Memory Layout 704
L[v] = Current Memory Layout 706

---

Matrix Multiplication 710

Inputs 712: {a, b}

Output 714: {out}

Expected Consumer Memory Layouts 716:
  E[a] = R / {C,R} / {R:2}
  E[b] = R / {C,R} / {R:2}

Expected Producer Memory Layout 718:
  P[out] = R / {C,R} / {R:2}

---

Cross-Entropy 720

Inputs 722: {x, y}

Output 724: {out}

Expected Consumer Memory Layouts 726:
  E[x] = C / {C,R} / {C:2}
  E[y] = C / {C} / {C:1}

Expected Producer Memory Layout 728:
  P[out] = C / {C} / {C:2}

FIG. 7A

Memory Layout Functions 700B $E[v]$ = Expected Consumer Memory Layout 702
$P[v]$ = Expected Producer Memory Layout 704
$L[v]$ = Current Memory Layout 706

---

Transpose 730

Input 732: {x}

Output 734: {out}

Expected Consumer Memory Layout 736:

$E[x] = L[out]$

Expected Producer Memory Layout 738:

$P[out] = L[x]$

---

Binary Addition 740

Inputs 742: {a, b}

Output 744: {out}

Expected Consumer Memory Layouts 746:
$E[a] = L[out]$
$E[b] = L[out]$

Expected Producer Memory Layout 748:

$P[out] = majority\_vote(L[a], L[b])$

Forward Traversal Logic 902

```
foreach value v in the graph in forward order: 904
    layout = producer(v).P[v]            906
    L[v] = first_defined(layout, L[v], G[v])
    G[v] = layout 908
           908       910       912
```
908
234
232
914

Backward Traversal Logic 916

```
foreach value v in the graph in reverse order: 918
    expected = {}
    foreach consumer c of value v:
        layout = c.E[v]        920
        add layout to expected         924
        R[v][c] = layout        922
    L[v] = majority_vote(expected)
           928
```
922
236
234

Undefined and Conflicted Memory Layout Detection Logic 930

```
conflict = {}
undefined = {}
foreach value v in the graph:                932
    if G[v] has an undefined field:
        add v to undefined
                                              934
    foreach consumer c of v:
        if R[v][c] != G[v]:
            add v to conflict
```

FIG. 9

| Maps | w 820 | x 822 | b 824 | y 826 | r0 832 | r1 842 | r2 852 |
|---|---|---|---|---|---|---|---|
| R[v] 236 | ? | ? | ? | ? | ? | ? | ? |
| G[v] 232 | ? | ? | ? | ? | ? | ? | ? |
| L[v] 234 | ? | ? | ? | ? | ? | ? | ? |

Initialization 1100

FIG. 11

First Forward Traversal 1200

```
                                                                    1202
input.P[w] = ?
L[w] = first_defined(input.P[w], L[w], G[w]) = ?
G[w] = input.P[w] = ?
```

```
                                                                    1212
input.P[x] = ?
L[x] = first_defined(input.P[x], L[x], G[x]) = ?
G[x] = input.P[x] = ?
```

```
                                                                    1222
input.P[b] = ?
L[b] = first_defined(input.P[b], L[b], G[b]) = ?
G[b] = input.P[b] = ?
```

```
                                                                    1232
input.P[y] = ?
L[y] = first_defined(input.P[y], L[y], G[y]) = ?
G[y] = input.P[y] = ?
```

```
                                                                    1242
matmul.P[r0] = R/{C,R}/{R:2}
L[r0] = first_defined(matmul.P[r0], L[r0], G[r0]) = R/{C,R}/{R:2}
G[r0] = matmul.P[r0] = R/{C,R}/{R:2}
```

```
                                                                    1252
add.P[r1] = majority_vote(L[r0], L[b]) = R/{C,R}/{R:2}
L[r1] = first_defined(add.P[r1], L[r1], G[r1]) = R/{C,R}/{R:2}
G[r1] = add.P[r1] = R/{C,R}/{R:2}
```

```
                                                                    1262
cross_entropy.P[r2] = C/{C}/{C:2}
L[r2] = first_defined(cross_entropy.P[r2], L[r2], G[r2]) = C/{C}/{C:2}
G[r2] = cross_entropy.P[r2] = C/{C}/{C:2}
```

FIG. 12

First Forward Traversal Map 1300

| Maps 1102 | w 820 | x 822 | b 824 | y 826 | r0 832 | r1 842 | r2 852 |
|---|---|---|---|---|---|---|---|
| R[v] 236 | ? | ? | ? | ? | ? | ? | ? |
| G[v] 232 | ? | ? | ? | ? | R/(C,R)/(R:2) 1302 | R/(C,R)/(R:2) 1304 | C/(C)/(C:2) 1306 |
| L[v] 234 | ? | ? | ? | ? | R/(C,R)/(R:2) 1312 | R/(C,R)/(R:2) 1314 | C/(C)/(C:2) 1316 |

FIG. 13

First Backward Traversal 1400

```
                                                                    1402
R[r2] = output.E[r2] = L[r2] = C/{C}/{C:2}
L[r2] = R[r2] = C/{C}/{C:2}
```

```
                                                                    1412
R[r1] = cross_entropy.E[r1] = C/{C,R}/{C:2}
L[r1] = R[r1] = C/{C,R}/{C:2}
R[y] = cross_entropy.E[y] = C/{C}/{C:1}
L[y] = R[y] = C/{C}/{C:1}
```

```
                                                                    1422
R[r0] = add.E[r0] = L[r1] = C/{C,R}/{C:2}
L[r0] = R[r0] = C/{C,R}/{C:2}
R[b] = add.E[b] = L[r1] = C/{C,R}/{C:2}
L[b] = R[b] = C/{C,R}/{C:2}
```

```
                                                                    1432
R[w] = matmul.E[w] = R/{C,R}/{R:2}
L[w] = R[w] = R/{C,R}/{R:2}
R[x] = matmul.E[x] = R/{C,R}/{R:2}
L[x] = R/{C,R}/{R:2}
```

FIG. 14

First Backward Traversal Map 1500

| Maps 1102 | w 820 | x 822 | b 824 | y 826 | r0 832 | r1 842 | r2 852 |
|---|---|---|---|---|---|---|---|
| R[v] 236 | R/{C,R}/{R:2} 1502 | R/{C,R}/{R:2} 1504 | C/{C,R}/{C:2} 1506 | C/{C}/{C:1} 1508 | C/{C,R}/{C:2} 1510 | C/{C,R}/{C:2} 1512 | C/{C}/{C:2} 1514 |
| G[v] 232 | ? | ? | ? | ? | R/{C,R}/{R:2} 1302 | R/{C,R}/{R:2} 1304 | C/{C}/{C:2} 1306 |
| L[v] 234 | R/{C,R}/{R:2} 1522 | R/{C,R}/{R:2} 1524 | C/{C,R}/{C:2} 1526 | C/{C}/{C:1} 1528 | C/{C,R}/{C:2} 1530 | C/{C,R}/{C:2} 1532 | C/{C}/{C:2} 1316 |

FIG. 15

Second Forward Traversal 1600

```
input.P[w] = ?                                                          1602
L[w] = first_defined(input.P[w], L[w], G[w])
     = first_defined(?, R/{C,R}/{R:2}, ?)
     = R/{C,R}/{R:2}
G[w] = input.P[w] = ?
```

```
                                                                        1612
input.P[x] = ?
L[x] = first_defined(input.P[x], L[x], G[x]) = R/{C,R}/{R:2}
G[x] = input.P[x] = ?
```

```
                                                                        1622
input.P[b] = ?
L[b] = first_defined(input.P[b], L[b], G[b]) = C/{C,R}/{C:2}
G[b] = input.P[b] = ?
```

```
                                                                        1632
input.P[y] = ?
L[y] = first_defined(input.P[y], L[y], G[y]) = C/{C}/{C:1}
G[y] = input.P[y] = ?
```

```
matmul.P[r0] = R/{C,R}/{R:2}                                            1642
L[r0] = first_defined(matmul.P[r0], L[r0], G[r0])
      = first_defined(R/{C,R}/{R:2}, C/{C,R}/{C:2}, R/{C,R}/{R:2})
      = R/{C,R}/{R:2}
G[r0] = matmul.P[r0] = R/{C,R}/{R:2}
```

```
                                                                        1652
add.P[r1] = majority_vote(L[r0], L[r1]) = R/{C,R}/{R:2}
L[r1] = first_defined(add.P[r1], L[r1], G[r1]) = R/{C,R}/{R:2}
G[r1] = add.P[r1] = R/{C,R}/{R:2}
```

```
                                                                        1662
cross_entropy.P[r2] = C/{C}/{C:2}
L[r2] = first_defined(cross_entropy.P[r2], L[r2], G[r2]) = C/{C}/{C:2}
G[r2] = cross_entropy.P[r2] = C/{C}/{C:2}
```

FIG. 16

Second Forward Traversal Map 1700

| Maps 1102 | w 820 | x 822 | b 824 | y 826 | r0 832 | r1 842 | r2 852 |
|---|---|---|---|---|---|---|---|
| R[v] 236 | R/{C,R}/{R:2} 1502 | R/{C,R}/{R:2} 1504 | C/{C,R}/{C:2} 1506 | C/{C}/{C:1} 1508 | C/{C,R}/{C:2} 1510 | C/{C,R}/{C:2} 1512 | C/{C}/{C:2} 1514 |
| G[v] 232 | ? | ? | ? | ? | R/{C,R}/{R:2} 1302 | R/{C,R}/{R:2} 1304 | C/{C}/{C:2} 1306 |
| L[v] 234 | R/{C,R}/{R:2} 1522 | R/{C,R}/{R:2} 1524 | C/{C,R}/{C:2} 1526 | C/{C}/{C:1} 1528 | R/{C,R}/{R:2} 1702 | R/{C,R}/{R:2} 1704 | C/{C}/{C:2} 1316 |

FIG. 17

Second Backward Traversal 1800

```
                                                                    1802
R[r2] = output.E[r2] = L[r2] = C/{C}/{C:2}
L[r2] = R[r2] = C/{C}/{C:2}
```

```
                                                                    1812
R[r1] = cross_entropy.E[r1] = C/{C,R}/{C:2}
L[r1] = R[r1] = C/{C,R}/{C:2}
R[y] = cross_entropy.E[y] = C/{C}/{C:1}
L[y] = R[y] = C/{C}/{C:1}
```

```
                                                                    1822
R[r0] = add.E[r0] = L[r1] = C/{C,R}/{C:2}
L[r0] = R[r0] = C/{C,R}/{C:2}
R[b] = add.E[b] = L[r1] = C/{C,R}/{C:2}
L[b] = R[b] = C/{C,R}/{C:2}
```

```
                                                                    1832
R[w] = matmul.E[w] = R/{C,R}/{R:2}
L[w] = R[w] = R/{C,R}/{R:2}
R[x] = matmul.E[x] = R/{C,R}/{R:2}
L[x] = R/{C,R}/{R:2}
```

FIG. 18

Second Backward Traversal Map 1900

| Maps 1102 | w 820 | x 822 | b 824 | y 826 | r0 832 | r1 842 | r2 852 |
|---|---|---|---|---|---|---|---|
| R[v] 236 | R/{C,R}/{R:2} 1502 | R/{C,R}/{R:2} 1504 | C/{C,R}/{C:2} 1506 | C/{C}/{C:1} 1508 | C/{C,R}/{C:2} 1510 | C/{C,R}/{C:2} 1512 | C/{C}/{C:2} 1514 |
| G[v] 232 | ? | ? | ? | ? | R/{C,R}/{R:2} 1302 | R/{C,R}/{R:2} 1304 | C/{C}/{C:2} 1306 |
| L[v] 234 | R/{C,R}/{R:2} 1522 | R/{C,R}/{R:2} 1524 | C/{C,R}/{C:2} 1526 | C/{C}/{C:1} 1528 | C/{C,R}/{C:2} 1902 | C/{C,R}/{C:2} 1904 | C/{C}/{C:2} 1316 |

FIG. 19

Conflict Detection Map 2000
R[v] ≠ L[v]

| Maps 1102 | w 820 | x 822 | b 824 | y 826 | r0 832 | r1 842 | r2 852 |
|---|---|---|---|---|---|---|---|
| R[v] 236 | R/{C,R}/{R:2} 1502 | R/{C,R}/{R:2} 1504 | C/{C,R}/{C:2} 1506 | C/{C}/{C:1} 1508 | C/{C,R}/{C:2} 1510 | C/{C,R}/{C:2} 1512 | C/{C}/{C:2} 1514 |
| G[v] 232 | ? | ? | ? | ? | R/{C,R}/{R:2} 1302 | R/{C,R}/{R:2} 1304 | C/{C}/{C:2} 1306 |
| L[v] 234 | R/{C,R}/{R:2} 1522 | R/{C,R}/{R:2} 1524 | C/{C,R}/{C:2} 1526 | C/{C}/{C:1} 1528 | R/{C,R}/{R:2} 2042 | R/{C,R}/{R:2} 2044 | C/{C}/{C:2} 1316 |
| ≠ | No | No | No | No | Yes 2010 | Yes 2012 | No |
| ? | No | No | No | No | No | No | No |

FIG. 20

First Forward Traversal 2200

```
input.P[w] = ?                                                    2202
L[w] = first_defined(input.P[w], L[w], G[w])
     = first_defined(?, R/{C,R}/{R:2}, ?)
     = R/{C,R}/{R:2}
G[w] = input.P[w] = ?
```

```
input.P[x] = ?                                                    2212
L[x] = first_defined(input.P[x], L[x], G[x]) = R/{C,R}/{R:2}
G[x] = input.P[x] = ?
```

```
input.P[b] = ?                                                    2222
L[b] = first_defined(input.P[b], L[b], G[b]) = C/{C,R}/{C:2}
G[b] = input.P[b] = ?
```

```
input.P[y] = ?                                                    2232
L[y] = first_defined(input.P[y], L[y], G[y]) = C/{C}/{C:1}
G[y] = input.P[y] = ?
```

```
matmul.P[r0] = R/{C,R}/{R:2}                                      2242
L[r0] = first_defined(matmul.P[r0], L[r0], G[r0])
      = first_defined(R/{C,R}/{R:2}, C/{C,R}/{C:2}, R/{C,R}/{R:2})
      = R/{C,R}/{R:2}
G[r0] = matmul.P[r0] = R/{C,R}/{R:2}
```

```
physical_transpose.P[r0'] = L[r0] = R/{C,R}/{R:2}                 2252
L[r0'] = first_defined(physical_transpose.P[r0'], L[r0'], G[r0'])
G[r0'] = physical_transpose.P[r0'] = C/{C,R}/{C:2}
```

```
L[r1] = first_defined(add.P[r1], L[r1], G[r1]) = C/{C,R}/{C:2}    2262
G[r1] = add.P[r1] = C/{C,R}/{C:2}
```

```
input.P[b] = ?                                                    2272
L[b] = first_defined(input.P[b], L[b], G[b]) = C/{C,R}/{C:2}
G[b] = input.P[b] = ?
```

FIG. 22

First Forward Traversal Map 2300

| Maps 1102 | w 820 | x 822 | b 824 | y 826 | r0 832 | r0' 2302 | r1 842 | r2 852 |
|---|---|---|---|---|---|---|---|---|
| R[v] 236 | R/{C,R}/{R:2} 1502 | R/{C,R}/{R:2} 1504 | C/{C,R}/{C:2} 1506 | C/{C}/{C:1} 1508 | C/{C,R}/{C:2} 1510 | ? 2312 | C/{C,R}/{C:2} 1512 | C/{C}/{C:2} 1514 |
| G[v] 232 | ? | ? | ? | ? | R/{C,R}/{R:2} 1302 | C/{C,R}/{C:2} 2322 | C/{C,R}/{C:2} 2324 | C/{C}/{C:2} 1306 |
| L[v] 234 | R/{C,R}/{R:2} 1522 | R/{C,R}/{R:2} 1524 | C/{C,R}/{C:2} 1526 | C/{C}/{C:1} 1528 | R/{C,R}/{R:2} 2042 | C/{C,R}/{C:2} 2332 | C/{C,R}/{C:2} 2334 | C/{C}/{C:2} 1316 |

FIG. 23

First Backward Traversal Map 2400

| Maps 1102 | w 820 | x 822 | b 824 | y 826 | r0 832 | r0' 2302 | r1 842 | r2 852 |
|---|---|---|---|---|---|---|---|---|
| R[v] 236 | R/{C,R}/{R:2} 1502 | R/{C,R}/{R:2} 1504 | C/{C,R}/{C:2} 1506 | C/{C}/{C:1} 1508 | R/{C,R}/{R:2} 2402 | C/{C,R}/{C:2} 2404 | C/{C,R}/{C:2} 1512 | C/{C}/{C:2} 1514 |
| G[v] 232 | ? | ? | ? | ? | R/{C,R}/{R:2} 1302 | C/{C,R}/{C:2} 2322 | C/{C,R}/{C:2} 2324 | C/{C}/{C:2} 1306 |
| L[v] 234 | R/{C,R}/{R:2} 1522 | R/{C,R}/{R:2} 1524 | C/{C,R}/{C:2} 1526 | C/{C}/{C:1} 1528 | R/{C,R}/{R:2} 2042 | C/{C,R}/{C:2} 2332 | C/{C,R}/{C:2} 2334 | C/{C}/{C:2} 1316 |

FIG. 24

```
// Model Inputs                                    2502
w = input(FP32, {M, K})    // R/{C,R}/{R:2}        2504
x = input(FP32, {K, N})    // R/{C,R}/{R:2}        2506
b = input(FP32, {M, N})    // C/{C,R}/{C:2}        2508
y = input(INT16, {M})      // C/{C}/{C:1}          2510

// Model operations
r0 = matmul(w, x)                // R/{C,R}/{R:2}   2512
r0' = physical_transpose(r0)     // C/{C,R}/{C:2}   2514
r1 = add(r0, b)                  // C/{C,R}/{C:2}   2516
r2 = cross_entropy(r1, y)        // C/{C}/{C:2}     2518

// Model Outputs
output(r2)  2520
```

FIG. 25

SYSTEMS AND METHODS FOR MEMORY LAYOUT DETERMINATION AND CONFLICT RESOLUTION

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/239, 252, now U.S. Pat. No. 10,698,853 B1, filed Jan. 3, 2019, entitled, "VIRTUALIZATION OF A RECONFIGURABLE DATA PROCESSOR;"

U.S. Nonprovisional patent application Ser. No. 16/197, 826, now U.S. Pat. No. 10,831,507 B2, filed Nov. 21, 2018, entitled, "CONFIGURATION LOAD OF A RECONFIGURABLE DATA PROCESSOR;"

U.S. Nonprovisional patent application Ser. No. 16/198, 086, now U.S. Pat. No. 11,188,497 B2, filed Nov. 21, 2018, entitled, "CONFIGURATION UNLOAD OF A RECONFIGURABLE DATA PROCESSOR;"

U.S. Nonprovisional patent application Ser. No. 16/260, 548, now U.S. Pat. No. 10,768,899 B2, filed Jan. 29, 2019, entitled, "MATRIX NORMAL/TRANSPOSE READ AND A RECONFIGURABLE DATA PROCESSOR INCLUDING SAME;"

U.S. Nonprovisional patent application Ser. No. 16/536, 192, now U.S. Pat. No. 11,080,227 B2, filed Aug. 8, 2019, entitled, "COMPILER FLOW LOGIC FOR RECONFIGURABLE ARCHITECTURES;"

U.S. Nonprovisional patent application Ser. No. 16/407, 675, now, U.S. Pat. No. 11,386,038 B2, filed May 9, 2019, entitled, "CONTROL FLOW BARRIER AND RECONFIGURABLE DATA PROCESSOR;"

U.S. Nonprovisional patent application Ser. No. 16/504, 627, now U.S. Pat. No. 11,055,141 B2, filed Jul. 8, 2019, entitled, "QUIESCE RECONFIGURABLE DATA PROCESSOR;"

U.S. Nonprovisional patent application Ser. No. 16/572, 516, filed Sep. 16, 2019, entitled, "EFFICIENT EXECUTION OF OPERATION UNIT GRAPHS ON RECONFIGURABLE ARCHITECTURES BASED ON USER SPECIFICATION;"

U.S. Nonprovisional patent application Ser. No. 16/744, 077, filed Jan. 15, 2020, entitled, "COMPUTATIONALLY EFFICIENT SOFTMAX LOSS GRADIENT BACK-PROPAGATION;"

U.S. Nonprovisional patent application Ser. No. 16/590, 058, now U.S. Pat. No. 11,327,713 B2, filed Oct. 1, 2019, entitled, "COMPUTATION UNITS FOR FUNCTIONS BASED ON LOOKUP TABLES;"

U.S. Nonprovisional patent application Ser. No. 16/695, 138, now U.S. Pat. No. 11,328,038 B2, filed Nov. 25, 2019, entitled, "COMPUTATION UNITS FOR BATCH NORMALIZATION;"

U.S. Nonprovisional patent application Ser. No. 16/688, 069, now U.S. Pat. No. 11,327,717 B2, filed Nov. 19, 2019, entitled, "LOOK-UP TABLE WITH INPUT OFFSETTING;"

U.S. Nonprovisional patent application Ser. No. 16/718, 094, now U.S. Pat. No. 11,150,872 B2, filed Dec. 17, 2019, entitled, "COMPUTATION UNITS FOR ELEMENT APPROXIMATION;"

U.S. Nonprovisional patent application Ser. No. 16/560, 057, now U.S. Pat. No. 11,327,923 B2, filed Sep. 4, 2019, entitled, "SIGMOID FUNCTION IN HARDWARE AND A RECONFIGURABLE DATA PROCESSOR INCLUDING SAME;"

U.S. Nonprovisional patent application Ser. No. 16/572, 527, now U.S. Pat. No. 11,410,027 B2, filed Sep. 16, 2019, entitled, "PERFORMANCE ESTIMATION-BASED RESOURCE ALLOCATION FOR RECONFIGURABLE ARCHITECTURES;"

U.S. Nonprovisional patent application Ser. No. 15/930, 381, now U.S. Pat. No. 11,250,105 B2, filed May 12, 2020, entitled, "COMPUTATIONALLY EFFICIENT GENERAL MATRIX-MATRIX MULTIPLICATION (GeMM);"

U.S. Nonprovisional patent application Ser. No. 16/890, 841, filed Jun. 2, 2020, entitled, "ANTI-CONGESTION FLOW CONTROL FOR RECONFIGURABLE PROCESSORS,";

U.S. Nonprovisional patent application Ser. No. 16/922, 975, filed Jul. 7, 2020, entitled, "RUNTIME VIRTUALIZATION OF RECONFIGURABLE DATAFLOW RESOURCES,";

US Nonprovisional Patent application Ser. No. 16/996,66, filed Aug. 18, 2020, entitled, "RUNTIME PATCHING OF CONFIGURATION FILES,"; and U.S. Nonprovisional patent application Ser. No. 17/023, 015, now U.S. Pat. No. 11,237,971 B1, filed Sep. 16, 2020, entitled, "COMPILE TIME LOGIC FOR DETECTING STREAMING COMPATIBLE AND BROADCAST COMPATIBLE DATA ACCESS PATTERNS."

FIELD OF THE TECHNOLOGY DISCLOSED

The present technology relates to compile time determination of tensor memory layouts, and detection and resolution of conflicts between the tensor memory layouts, which can be particularly applied to processors such as central processing unit (CPUs), graphics processing units (GPUs), field programmable gate arrays (FPGAs), coarse-grained reconfigurable architectures (CGRAs), and application-specific integrated circuits (ASICs).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The technology disclosed relates to automatically assigning and optimizing the physical memory layouts of all intermediate dense tensor data in a program. In high-level programming languages, dense tensors are presented as abstract multi-dimensional arrays. Typically, at run time, tensor elements are stored contiguously in memory according to a predetermined physical layout. For example, one common physical layout, referred to as "row-major order," is where elements in a single row of a matrix are consecutive in physical memory and rows are sequentially concatenated.

High-level compilers working at the abstraction level of tensor operations must decide the physical layout of every tensor such that they are compatible with the operations which produce and use them. While one such (trivial) solution is to give every tensor a row-major physical layout, this solution may not have optimal application performance. Furthermore, in kernel-based compilation flows, operation kernels with fixed physical layout constraints may not be compatible with row-major layouts.

The technology disclosed is an implementation of a compiler analysis and transformation pass which automatically determines required physical layouts in light of kernel operation and performance requirements. The proposed solution also inserts physical layout conversion operations where necessary in cases of unresolvable incompatibilities. The pass takes as input a program acyclic dataflow graph and a set of physical layout constraints for every known operation. Physical layout constraints are defined on each operation input and output. Constraints are permitted to be absolute or conditional. A conditional constraint is written as a function on an operation instance (to account for specific operation parameters) and the current layouts of its inputs and outputs. A single operation type constrains both its inputs with a required physical layout and its outputs with a generated physical layout.

SUMMARY

A technology is described which enables compile time determination of tensor memory layouts, and detection and resolution of conflicts between the tensor memory layouts in processors such as central processing unit (CPUs), graphics processing units (GPUs), field programmable gate arrays (FPGAs), coarse-grained reconfigurable architectures (CGRAs), and application-specific integrated circuits (ASICs).

A system is described. The system comprises memory and compile time logic. The memory stores a dataflow graph for an application. The dataflow graph has operation units that are configured to be producer operation units to produce tensors for execution of the application, and to be consumer operation units to consume the tensors for execution of the application. The compile time logic has access to the memory and is configured to process the dataflow graph to determine, for the tensors, expected producer memory layouts, expected consumer memory layouts, and current memory layouts. The expected producer memory layouts specify memory layouts required by the producer operation units that produce the tensors. The expected consumer memory layouts specify the memory layouts required by the consumer operation units that consume the tensors. The current memory layouts specify the memory layouts of the tensors. Each of the memory layouts includes a vector dimension and at least one of a vector ordering and a data alignment. The compile time logic is configured to store the expected producer memory layouts, the expected consumer memory layouts, and the current memory layouts in the memory for use in processing the tensors through the dataflow graph.

In one implementation, the memory stores memory layout functions that generate the expected producer memory layouts and the expected consumer memory layouts based on operation types implemented by the operation units.

In one implementation, the compile time logic is further configured to process the dataflow graph in a forward traversal, starting from a first operation unit and progressing to successive operation units, to determine the expected producer memory layouts using the memory layout functions, and the current memory layouts based on the expected producer memory layouts. In one implementation, the compile time logic is further configured to reprocess the dataflow graph in a backward traversal, starting from a last operation unit and progressing to preceding operation units, to determine the expected consumer memory layouts using the memory layout functions, and redetermine the current memory layouts based on the expected consumer memory layouts.

In some implementations, the compile time logic is further configured to determine the current memory layouts based on a redetermination in a prior backward traversal. In some implementations, the compile time logic is further configured to determine the current memory layouts based on a determination in a prior forward traversal. In some implementations, the compile time logic is further configured to redetermine the current memory layouts based on a majority vote between a plurality of the expected consumer memory layouts.

In one implementation, the compile time logic is further configured to iterate the processing and the reprocessing of the dataflow graph until convergence. The convergence occurs when the expected producer memory layouts and the expected consumer memory layouts remain constant between iterations. In some implementations, upon the convergence, the compile time logic is further configured to further process the dataflow graph to detect undefined instances of the current memory layouts.

In one implementation, the compile time logic is further configured to use a set of heuristics to assign the memory layouts to the undefined instances of the current memory layouts. The heuristics in the set of heuristics are based on tensor rank.

In some implementations, upon the convergence, the compile time logic is further configured to detect a memory layout conflict, and to resolve the memory layout conflict by using memory layout conversion operations. In one implementation, the compile time logic is further configured to detect the memory layout conflict when the expected consumer memory layouts are different from corresponding ones of the expected producer memory layouts, and to resolve the memory layout conflict by modifying the dataflow graph to cause the expected consumer memory layouts to match the corresponding ones of the expected producer memory layouts.

In another implementation, the compile time logic is further configured to detect the memory layout conflict when the expected consumer memory layouts are different from corresponding ones of the current memory layouts, and to resolve the memory layout conflict by modifying the dataflow graph to cause the expected consumer memory layouts to match the corresponding ones of the current memory layouts.

In some implementations, upon the convergence, the compile time logic is further configured to detect multiple instances of the memory layout conflict, and to resolve the multiple instances of the memory layout conflict by using the memory layout conversion operations. In some implementations, the memory layout conversion operations include a transpose operation that modifies the current memory layouts by changing the vector dimension of corresponding ones of the tensors. In other implementations, the memory layout conversion operations include a shuffle operation that modifies the current memory layouts by changing the vector ordering of the corresponding ones of the tensors. In yet other implementations, the memory layout conversion operations include a realignment operation that modifies the current memory layouts by changing the data alignment of the corresponding ones of the tensors. The compile time logic is further configured to insert, in the dataflow graph, new operation units that implement the memory layout conversion operations, and to generate an updated version of the dataflow graph. In some implementations, the compile time logic is further configured to iterate the processing and the reprocessing of the updated version of the dataflow graph as long as the undefined instances of the current memory layouts and the memory layout conflict are detected.

In another implementation, a computer-implemented method is described. The method includes storing a dataflow graph for an application. The dataflow graph has operation units that are configured to be producer operation units to produce tensors for execution of the application, and to be consumer operation units to consume the tensors for execution of the application. The method includes processing the dataflow graph to determine, for the tensors, expected producer memory layouts, expected consumer memory layouts, and current memory layouts. The expected producer memory layouts specify memory layouts required by the producer operation units that produce the tensors. The expected consumer memory layouts specify the memory layouts required by the consumer operation units that consume the tensors. The current memory layouts specify the memory layouts of the tensors. Each of the memory layouts includes a vector dimension and at least one of a vector ordering and a data alignment. The method includes storing the expected producer memory layouts, the expected consumer memory layouts, and the current memory layouts for use in processing the tensors through the dataflow graph.

A system is described. The system comprises memory and compile time logic. The memory stores a dataflow graph for an application. The dataflow graph has operation units that are configured to be producer operation units to produce tensors for execution of the application, and to be consumer operation units to consume the tensors for execution of the application. The compile time logic has access to the memory and is configured to process the dataflow graph to determine, for the tensors, expected producer memory layouts, expected consumer memory layouts, and current memory layouts. The expected producer memory layouts specify memory layouts required by the producer operation units that produce the tensors. The expected consumer memory layouts specify the memory layouts required by the consumer operation units that consume the tensors. The current memory layouts specify the memory layouts of the tensors. Each of the memory layouts includes a vector dimension and at least one of a vector ordering and a data alignment. The compile time logic is configured to detect memory layout conflicts when the expected consumer memory layouts are different from corresponding ones of the expected producer memory layouts and/or when the expected consumer memory layouts are different from corresponding ones of the current memory layouts. The compile time logic is configured to resolve the memory layout conflicts by modifying the dataflow graph to cause the expected consumer memory layouts to match the corresponding ones of the expected producer memory layouts and/or to cause the expected consumer memory layouts to match the corresponding ones of the current memory layouts.

In another implementation, a computer-implemented method is described. The method includes storing a dataflow graph for an application. The dataflow graph has operation units that are configured to be producer operation units to produce tensors for execution of the application, and to be consumer operation units to consume the tensors for execution of the application. The method includes processing the dataflow graph to determine, for the tensors, expected producer memory layouts, expected consumer memory layouts, and current memory layouts. The expected producer memory layouts specify memory layouts required by the producer operation units that produce the tensors. The expected consumer memory layouts specify the memory layouts required by the consumer operation units that consume the tensors. The current memory layouts specify the memory layouts of the tensors. Each of the memory layouts includes a vector dimension and at least one of a vector ordering and a data alignment. The method includes detecting memory layout conflicts when the expected consumer memory layouts are different from corresponding ones of the expected producer memory layouts and/or when the expected consumer memory layouts are different from corresponding ones of the current memory layouts. The method includes resolving the memory layout conflicts by modifying the dataflow graph to cause the expected consumer memory layouts to match the corresponding ones of the expected producer memory layouts and/or to cause the expected consumer memory layouts to match the corresponding ones of the current memory layouts.

One or more implementations of the technology disclosed or elements thereof can be implemented in the form of a computer product including a non-transitory computer readable storage medium with computer usable program code for performing the method steps indicated. Furthermore, one or more implementations of the technology disclosed or elements thereof can be implemented in the form of an apparatus including a memory and at least one processor that is coupled to the memory and operative to perform exemplary method steps. Yet further, in another aspect, one or more implementations of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

These and other features, aspects, and advantages of the technology disclosed will become apparent from the following detailed description of illustrative implementations thereof, which is to be read in connection with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab. In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 5 portrays examples of data alignment of the disclosed tensor memory layouts.

FIGS. 7A and 7B show examples of memory layout functions that generate the expected producer memory layouts and the expected consumer memory layouts based on operation types implemented by the operation units.

FIG. 9 depicts forward traversal logic, backward traversal logic, and undefined and conflicted memory layout detection logic used by the disclosed compile time logic.

FIG. 11 shows initialization of the expected producer memory layouts, the expected consumer memory layouts, and the current memory layouts.

FIG. 12 shows a first forward traversal that determines the expected producer memory layouts using the memory layout functions, and the current memory layouts based on the expected producer memory layouts.

FIG. 13 is a first forward traversal map depicting the expected producer memory layouts and the current memory layouts determined by the first forward traversal in FIG. 12.

FIG. 14 shows a first backward traversal that determines the expected consumer memory layouts using the memory layout functions, and redetermines the current memory layouts based on the expected consumer memory layouts.

FIG. 15 is a first backward traversal map depicting the expected consumer memory layouts determined and the current memory layouts redetermined by the first backward traversal in FIG. 14.

FIG. 16 shows a second forward traversal that again determines the expected producer memory layouts using the memory layout functions, and the current memory layouts based on the expected producer memory layouts.

FIG. 17 is a second forward traversal map depicting the expected producer memory layouts and the current memory layouts again determined by the second forward traversal in FIG. 16.

FIG. 18 shows a second backward traversal that again determines the expected consumer memory layouts using the memory layout functions, and again redetermines the current memory layouts based on the expected consumer memory layouts.

FIG. 19 is a second backward traversal map depicting the expected consumer memory layouts again determined and the current memory layouts again redetermined by the second backward traversal in FIG. 18.

FIG. 20 is a conflict detection map that shows the memory layout conflicts detected in the dataflow graph of FIG. 8.

FIG. 22 shows a first forward traversal of the updated version of the dataflow graph.

FIG. 23 is a first forward traversal map for the updated version of the dataflow graph.

FIG. 24 is a first backward traversal map for the updated version of the dataflow graph.

FIG. 25 shows the final tensor memory layouts determined for the updated version of the dataflow graph.

DETAILED DESCRIPTION

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Figure 1:
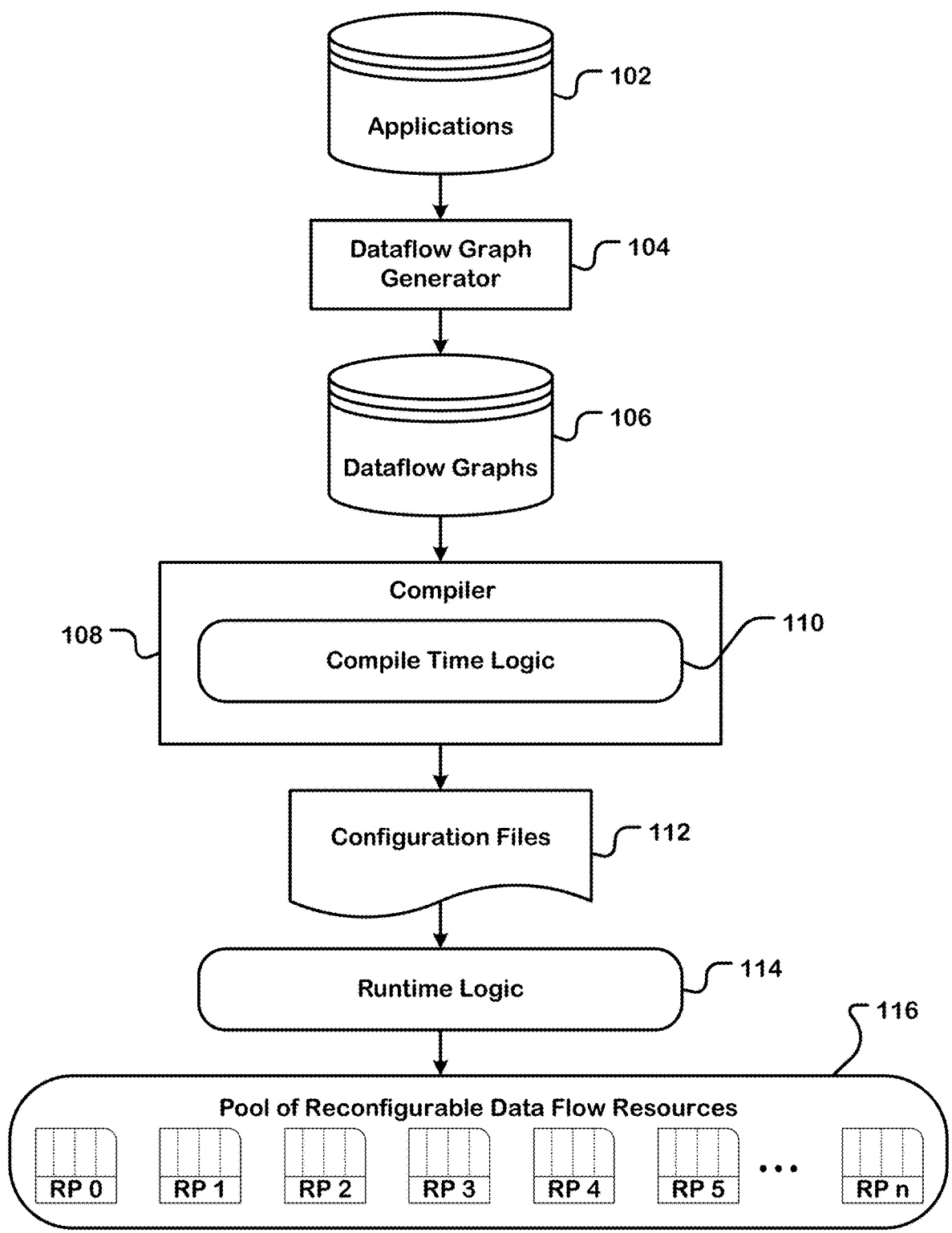
FIG. 1 is a block diagram that shows various aspects of the technology disclosed.

FIG. 1 is a block diagram that shows various aspects of the technology disclosed. Reconfigurable dataflow resources in the pool of reconfigurable dataflow resources 116 include reconfigurable processors. A reconfigurable processor includes an array of configurable units (e.g., compute units and memory units) in a programmable interconnect fabric. The array of configurable units in a reconfigurable processor is partitionable into a plurality of subarrays (or tiles) of configurable units. Additional details about the architecture of the reconfigurable processors are discussed later in FIGS. 27, 28, 29, 29B, 30, and 31.

The pool of reconfigurable dataflow resources 116 also includes bus resources (or transfer resources). Examples of the bus resources include PCIe channels, DMA channels, and DDR channels. The pool of reconfigurable dataflow resources 116 also includes memory resources (or storage resources). Examples of the memory resources include main memory (e.g., off-chip/external DRAM), local secondary storage (e.g., local disks (e.g., HDD, SSD)), and remote secondary storage (e.g., distributed file systems, web servers). Other examples of the memory resources include latches, registers, and caches (e.g., SRAM). The pool of reconfigurable dataflow resources 116 is dynamically scalable to meet the performance objectives required by applications 102 (or user applications 102). The applications 102 access the pool of reconfigurable dataflow resources 116 over one or more networks (e.g., Internet).

In some implementations, different compute scales and hierarchies form the pool of reconfigurable dataflow resources 116 according to different implementations of the technology disclosed. In one example, the pool of reconfigurable dataflow resources 116 is a node (or a single machine) that runs a plurality of reconfigurable processors, supported by required bus and memory resources. The node also includes a host processor (e.g., CPU) that exchanges data with the plurality of reconfigurable processors, for example, over a PCIe interface. The host processor includes a runtime processor that manages resource allocation, memory mapping, and execution of configuration files for applications requesting execution from the host processor. In another example, the pool of reconfigurable dataflow resources 116 is a rack (or cluster) of nodes, such that each node in the rack runs a respective plurality of reconfigurable processors, and includes a respective host processor configured with a respective runtime processor. The runtime processors are distributed across the nodes and communicate with each other so that they have unified access to the reconfigurable processors attached not only to their own node on which they run, but also to the reconfigurable processors attached to every other node in the data center.

The nodes in the rack are connected, for example, over Ethernet or InfiniBand (IB). In yet another example, the pool of reconfigurable dataflow resources 116 is a pod that comprises a plurality of racks. In yet another example, the pool of reconfigurable dataflow resources 116 is a superpod that comprises a plurality of pods. In yet another example, the pool of reconfigurable dataflow resources 116 is a zone that comprises a plurality of superpods. In yet another example, the pool of reconfigurable dataflow resources 116 is a data center that comprises a plurality of zones.

The applications 102 are executed on the reconfigurable processors in the pool of reconfigurable dataflow resources 116 in a distributed fashion by programming the individual compute and memory components to asynchronously receive, process, and send data and control information. In the reconfigurable processors, computation can be executed as deep, nested dataflow pipelines that exploit nested parallelism and data locality very efficiently. These dataflow pipelines contain several stages of computation, where each stage reads data from one or more input buffers with an irregular memory access pattern, performs computations on the data while using one or more internal buffers to store and retrieve intermediate results, and produces outputs that are written to one or more output buffers. The structure of these pipelines depends on the control and dataflow graph representing the application. Pipelines can be arbitrarily nested and looped within each other.

The applications 102 comprise high-level programs. A high-level program is source code written in programming languages like C, C++, Java, JavaScript, Python, and Spatial, for example, using deep learning frameworks like PyTorch, TensorFlow, ONNX, Caffe, and Keras. The high-level program can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL. In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the innermost loop body, which can be exploited using loop unrolling, SIMD vectorization, and pipelining.

Regarding loops in the high-level programs of the applications 102, loops directly nested in a loop body are termed the child loops of the outer parent loop. A loop is called an innermost loop if it does not have any children, i.e., there are no nested loops within its body. A loop is an outermost loop if it does not have a parent, i.e., it is not nested within another loop's body. An imperfectly nested loop has a body with a mix of non-looping statements (e.g., primitive arithmetic, logical, and relational operations) and one or more child loops. Parallelism in the imperfectly nested loops can be exploited at any or all loop levels, and in the operations that comprise loop bodies. Parallelism can occur in multiple forms such as fine-grained and coarse-grained pipeline parallelism, data parallelism, and task parallelism.

In some implementations, a software development kit (SDK) (or dataflow graph generator 104) generates dataflow graphs 106 of the high-level programs of the applications 102. The SDK transforms the input behavioral description of the high-level programs into an intermediate representation such as the dataflow graphs 106. This may include code optimization steps like false data dependency elimination, dead-code elimination, and constant folding. The dataflow graphs 106 encode the data and control dependencies of the high-level programs.

The dataflow graphs 106 comprise nodes and edges. The nodes can represent compute operations and memory allocations. The edges can represent data flow and control flow. In some implementations, each loop in the high-level programs can be represented as a controller in the dataflow graphs 106. The dataflow graphs 106 support branches, loops, function calls, and other variations of control dependencies. In some implementations, after the dataflow graphs 106 are generated, additional analyses or optimizations focused on loop transformations can be performed, such as loop unrolling, loop pipelining, loop fission/fusion, and loop tiling.

The SDK also supports programming the reconfigurable processors in the pool of reconfigurable dataflow resources 116 at multiple levels, for example, from the high-level deep learning frameworks to C++ and assembly language. In some implementations, the SDK allows programmers to develop code that runs directly on the reconfigurable processors. In other implementations, the SDK provides libraries that contain predefined functions like linear algebra operations, element-wise tensor operations, non-linearities, and reductions required for creating, executing, and profiling the dataflow graphs 106 on the reconfigurable processors. The SDK communicates with the deep learning frameworks via application programming interfaces (APIs).

A compiler 108 transforms the dataflow graphs 106 into a hardware-specific configuration, which is specified in an execution file generated by the compiler 108. In one implementation, the compiler 108 partitions the dataflow graphs 106 into memory allocations and execution fragments, and these partitions are specified in the execution file. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as needed by the program. Different ones of the execution fragments can contain different amounts of computation. Execution fragments can represent parallel patterns or portions of parallel patterns and are executable asynchronously.

In some implementations, the partitioning of the dataflow graphs 106 into the execution fragments includes treating calculations within at least one innermost loop of a nested loop of the dataflow graphs 106 as a separate execution fragment. In other implementations, the partitioning of the dataflow graphs 106 into the execution fragments includes treating calculations of an outer loop around the innermost loop of the dataflow graphs 106 as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data required to implement the dataflow graphs 106, and these memory allocations are specified in the execution file. Memory allocations define the type and the number of hardware resources (functional units, storage, or connectivity components). Main memory (e.g., DRAM) is off-chip memory for which the memory allocations can be made. Scratchpad memory (e.g., SRAM) is on-chip memory for which the memory allocations can be made. Other memory types for which the memory allocations can be made for various access patterns and layouts include read-only lookup-tables (LUTs), fixed size queues (e.g., FIFOs), and register files.

The compiler 108 binds memory allocations to virtual memory units and binds execution fragments to virtual compute units, and these bindings are specified in the execution file. In some implementations, the compiler 108 partitions execution fragments into memory fragments and compute fragments, and these partitions are specified in the execution file. A memory fragment comprises address calculations leading up to a memory access. A compute fragment comprises all other operations in the parent execution fragment. In one implementation, each execution fragment is broken up into a plurality of memory fragments and exactly one compute fragment. In one implementation, the compiler 108 performs the partitioning using reverse dataflow analysis such that inputs to an address used in a memory access are recursively flagged until the compiler 108 reaches either constant values or (bound) loop/pattern iterators. A single execution fragment can produce one or more memory fragments, depending on how many memory accesses exist in the original loop body. In cases where the same memory addressing logic is shared across multiple memory accesses, address calculation may be duplicated to create multiple memory fragments from the same execution fragment.

The memory fragments of the execution fragments are configured to index into data structures. At least one of the memory fragments indexes into a data structure in the logical memory spaces of one of the memory allocations. Each compute and memory fragment preserves information about all loops whose loop bodies directly contain the operations in the corresponding execution fragment. In one implementation, this corresponds to replicating the calculation of the loop iterators of each loop into each compute and memory fragment. This replication allows each fragment to preserve the same iterative behavior as the original program while also allowing distributed calculation of loop iterators.

The compiler 108 assigns the memory fragments to the virtual memory units and assigns the compute fragments to the virtual compute units, and these assignments are specified in the execution file. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler 108 allocates the virtual memory units to physical memory units of a reconfigurable processor in the pool of reconfigurable data flow resources 116 (e.g., pattern memory units (PMUs) of the reconfigurable processor) and allocates the virtual compute units to physical compute units of the reconfigurable processor (e.g., pattern compute units (PCUs) of the reconfigurable processor), and these allocations are specified in the execution file. The compiler 108 places the physical memory units and the physical compute units onto positions in an array of configurable units of the reconfigurable processor and routes data and control networks between the placed positions, and these placements and routes are specified in the execution file. In one implementation, this includes allocating physical resources such as counters and registers within each physical memory and compute unit, and these allocations are specified in the execution file.

The compiler 108 translates the applications 102 developed with commonly used open-source packages such as Keras and PyTorch into reconfigurable processor specifications. The compiler 108 generates configuration files 112 with configuration data for the placed positions and the routed data and control networks. In one implementation, this includes assigning coordinates and communication resources of the physical memory and compute units by placing and routing units onto the array of the processor while maximizing bandwidth and minimizing latency.

Figure 2:
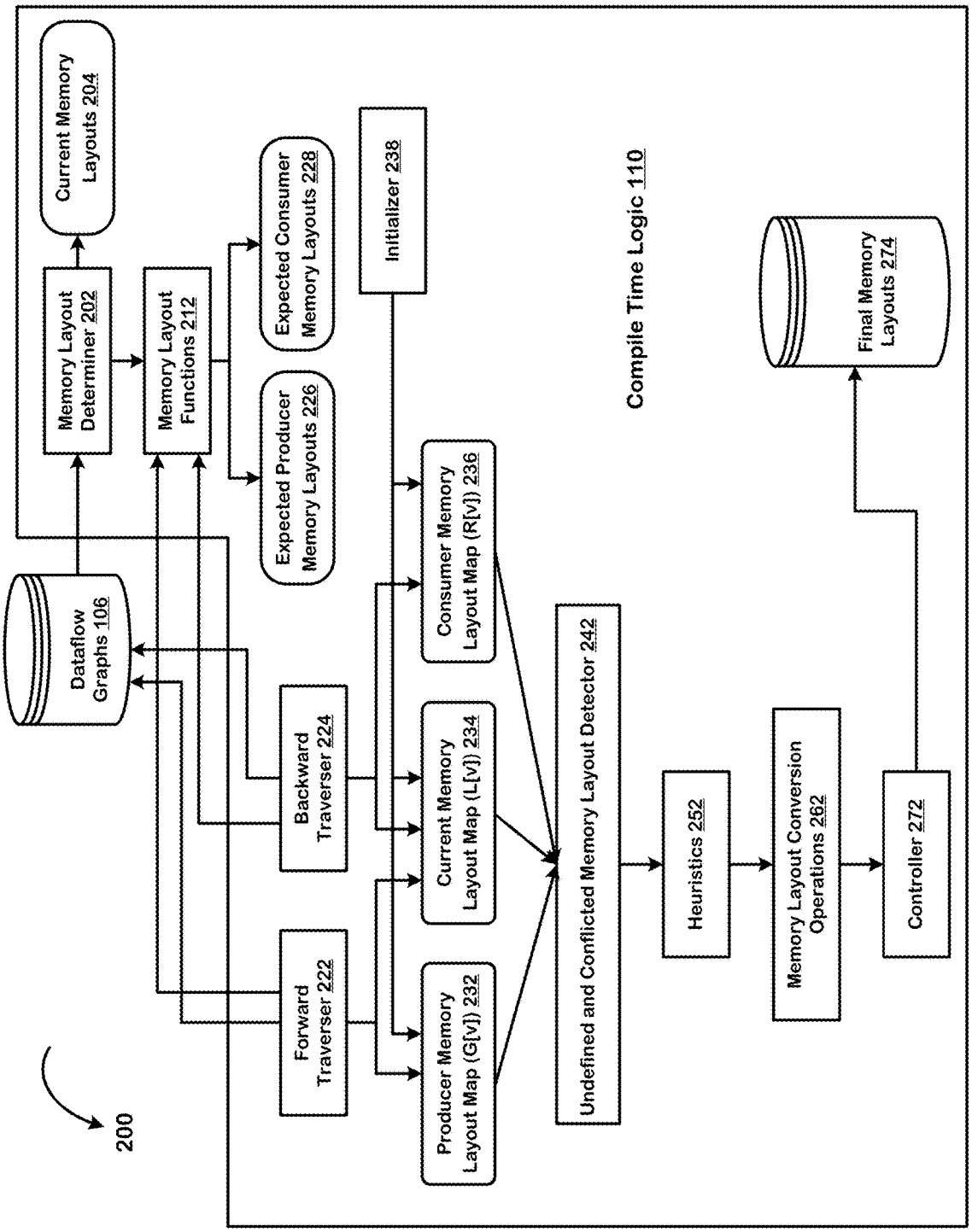
FIG. 2 depicts a heuristics diagram of the disclosed compile time logic that determines tensor memory layouts, and detects and resolves conflicts between the tensor memory layouts.

The compiler 108 comprises compile time logic 110. FIG. 2 depicts a heuristics diagram 200 of the compile time logic 110. The compile time logic 110 has access to the dataflow graphs 106. The nodes in the dataflow graphs 106 represent operation units that are configured to be producers to produce tensors for execution of an application, and to be consumers to consume the tensors for execution of the application. The producers and consumers asynchronously transmit data along data connections. A tensor includes one or more vectors.

The compile time logic 110 further comprises a memory layout determiner 202. The memory layout determiner 202 calculates, for the tensors in the dataflow graphs 106, expected producer memory layouts 226, expected consumer memory layouts 228, and current memory layouts 204. The expected producer memory layouts 226 specify memory layouts required by the producer operation units in the dataflow graphs 106 that produce the tensors. The expected consumer memory layouts 228 specify the memory layouts required by the consumer operation units in the dataflow graphs 106 that consume the tensors. The current memory layouts specify the memory layouts of the tensors.

Each of the memory layouts includes a vector dimension and at least one of a vector ordering and a data alignment. The memory layouts provide a mapping between elements of the tensors and locations in linear memory. A linear memory model, also known as the flat memory model, refers to a memory addressing technique in which memory is organized in a single contiguous address space. This means that a processing unit can access these memory locations directly as well as linearly. An address is an offset which is used to denote the exact place of a memory chunk. Data is the value stored in that memory location. In a linear memory model, the entire memory space is linear, sequential, and contiguous. The address ranges from 0 to MaxByte−1, where MaxByte is the maximum size of memory.

Figure 3:
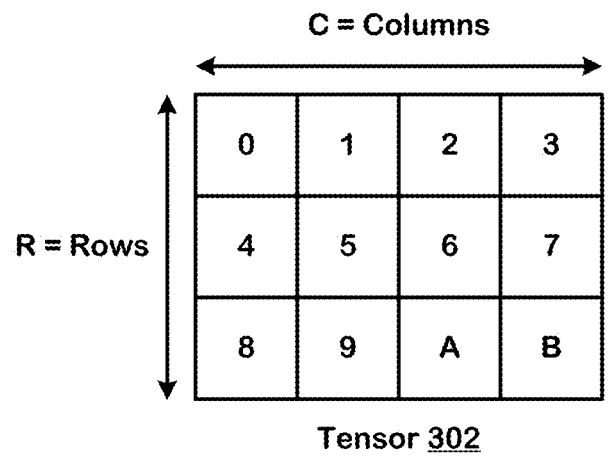
FIG. 3 portrays examples of vector dimension of the disclosed tensor memory layouts.

FIG. 3 portrays examples of vector dimension of a memory layout of a tensor 302. The vector dimension is the innermost dimension over which the logical indices of each element change within a single vector. The vector dimension determines which "direction" vectors are oriented across the tensor 302. FIG. 3 shows a logical view of the tensor 302. In FIG. 3, the red boxes show the arrangement for a single physical vector in the tensor 302, where each vector comprises two elements. FIG. 3 also shows a column (C) vector dimension 312 and a row (R) vector dimension 322. In the column (C) vector dimension 312, the vectors of the tensor 302 are oriented in the column (C) direction. In the row (R) vector dimension 322, the vectors of the tensor 302 are oriented in the row (R) direction.

Figure 4:
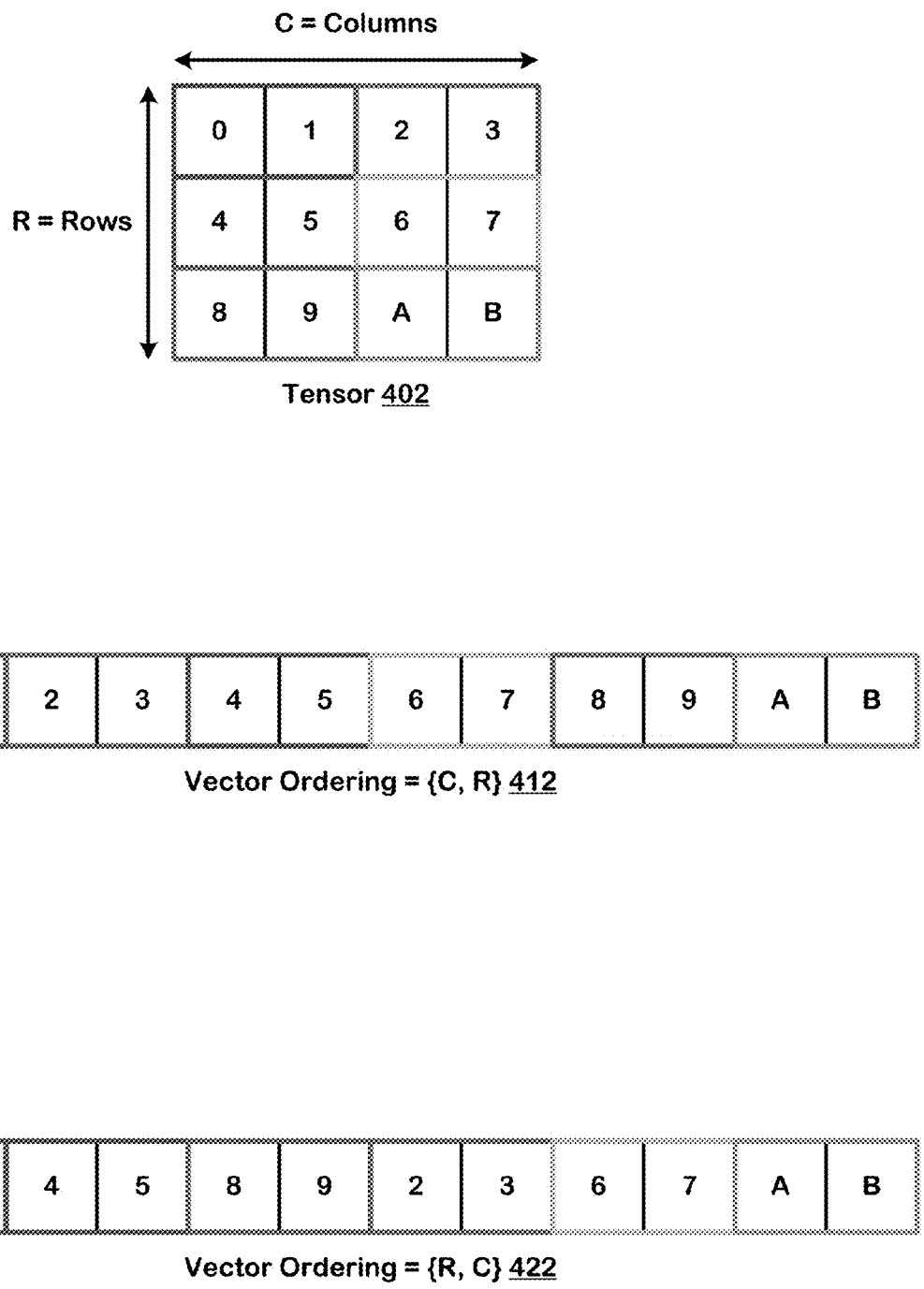
FIG. 4 portrays examples of vector ordering of the disclosed tensor memory layouts.

FIG. 4 portrays examples of vector ordering of the memory layout of a tensor 402. The vector ordering is the order in which vectors are laid out in linear memory with respect to the original logical dimensions of the tensor 402. FIG. 4 shows a logical view of the tensor 402, which has three rows and four columns (R=3, C=4). In FIG. 4, the multi-colored boxes denote the vector boundaries. FIG. 4 also shows two vector orderings 412, 422, both where the tensor 402 has a vector dimension of C. The two vector orderings 412, 422 are also arrays which denote the physical arrangement of the data in the physical memory. The vector ordering 412 is {C, R}, i.e., the vectors are stored across columns (C) first and then across rows (R). The vector ordering 422 is {R, C}, i.e., the vectors are stored across rows (R) first and then across columns (C).

FIG. 5 portrays examples of data alignment of the memory layout of a tensor 502. Some operations require addition of extra elements at the end of a dimension so as to "pad" out the last vector in that dimension. Alignment is a data format used to preserve logical dimension boundaries within vectors. Without padding, a given tensor shape may have elements that cross logical boundaries. For example, a vector may contain elements from two logical rows. By padding the end of the dimension to a number of elements that is a multiple of the vector size, the boundaries are preserved. This is required when the number of elements in that dimension is not an exact multiple of some required block size. Generally, this is the size of a vector, but in some special cases, a dimension must be aligned to a nearest multiple of some other number of elements. This information is stored as a list of required alignments (in elements) for each dimension. An alignment of one element means no extra padding is required. For brevity, after the initial examples, we omit alignments of one element (and hold this as the default).

FIG. 5 shows a logical view of the tensor 502, which has three rows and four columns (R=3, C=4). In FIG. 5, the multi-colored boxes denote the dimension boundaries 512, 532. FIG. 5 also shows two data alignments 522, 542, both where the tensor 502 has the vector dimension of R and the vector ordering of {R, C}. The two data alignments 522, 542 are also arrays which denote the physical ordering of data in the physical memory at runtime. In FIG. 5, "X" denotes padding elements that are not present in the original tensor 502. The data alignment 522 is {R:1, C:1}, i.e., no additional padding is used and the vectors cross logical dimension boundaries. The data alignment 542 is {R:2, C:1}, i.e., aligned to vector size on row dimension, with padding added to the end of each column at the cost of extra memory requirements but with the benefit of preserving logical dimension boundaries in all vectors.

Figure 6:
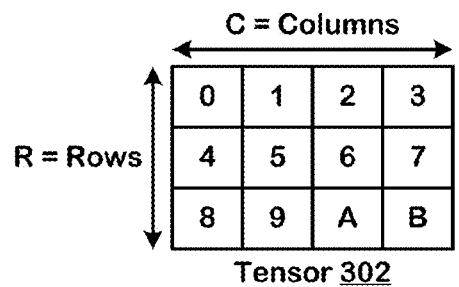
FIG. 6 portrays examples of the disclosed tensor memory layouts.

FIG. 6 portrays examples of a plurality of memory layouts 602, 612, and 622 for the tensor 302. That is, the vectors of the tensor 302 can be stored in physical memory using any of the memory layouts 602, 612, and 622. The memory layout 602 is "R/{R, C}/{R: 1, C: 1}" based on the dimension boundaries 512, the memory layout 612 is "R/{R, C}/{R: 2, C: 1}" based on the dimension boundaries 532, and the memory layout 622 is "R/{C, R}/{R: 2, C: 1}" based on the dimension boundaries 632. In FIG. 6, "X" denotes padding elements that are not present in the original tensor 302.

According to the memory layout 602, the vectors of the tensor 302 are oriented in the row (R) dimension, the vectors of the tensor 302 are stored across rows (R) first and then across columns (C), and the vectors of the tensor 302 cross logical dimension boundaries, with no additional padding.

According to the memory layout 612, the vectors of the tensor 302 are oriented in the row (R) dimension, the vectors of the tensor 302 are stored across rows (R) first and then across columns (C), and the vectors of the tensor 302 are aligned to vector size on row dimension, with padding added to the end of each column at the cost of extra memory requirements but with the benefit of preserving logical dimension boundaries in all vectors.

According to the memory layout 622, the vectors of the tensor 302 are oriented in the row (R) dimension, the vectors of the tensor 302 are stored across columns (C) first and then across rows (R), and the vectors of the tensor 302 are aligned to vector size on row dimension, with padding added to the end of each column at the cost of extra memory requirements but with the benefit of preserving logical dimension boundaries in all vectors.

The memory layout determiner 202 uses memory layout functions 212 to layout functions that generate the expected producer memory layouts 226 and the expected consumer memory layouts 228 based on operation types (or kernels) implemented by the operation units in the dataflow graphs 106. The memory layout functions 212 span all known operation types like non-linearities such as rectified linear unit (ReLU) and its variants (e.g., leaky ReLU), hyperbolic tangent (tanh), sigmoid, softmax, etc., element-wise addition, matrix multiplication (e.g., general matrix multiply (GeMM), layer normalization (e.g., batch normalization), loss functions like cross-entropy, tensor shape modifiers like transpose, and so on. The operation types (or kernels) have certain constraints on what physical data layouts they can process. These constraints depend in part on the nature of the hardware, the implementation decisions within the kernel itself, and characteristics of the operation type. These constraints can be partial (in that they constrain only some of the fields of the layout relative to the value of others), or total (in that the kernel expects or produces only a specific layout). Constraints on one kernel input or output can also be relative with respect to the memory layouts of its other inputs and outputs. The constraints are represented as the memory layout functions 212 that return an expected or generated memory layout as a function of other memory layouts.

FIGS. 7A and 7B show examples of memory layout functions 700A and 700B that generate the expected producer memory layouts 226 and the expected consumer memory 228 layouts based on operation types (or kernels) implemented by the operation units in the dataflow graphs 106. In FIGS. 7A and 7B, "E[v]" is the expected consumer memory layout 702 for a subject operation type, "P[v]" is the expected producer memory layout 704 for the subject operation type, and "L[v]" is the current memory layout 706 for the subject operation type.

A matrix multiplication operation type 710 consumes two inputs 712 {a, b} and produces an output 714 {out}. The expected consumer memory layouts 716 for both the inputs 712 {a, b} are the same. The expected producer memory layout 718 for the output 714 {out} is also the same as the inputs 712 {a, b}.

A cross-entropy operation type 720 consumes two inputs 722 {x, y} and produces an output 724 {out}. The expected consumer memory layouts 726 for the inputs 722 {x, y} are different. The expected producer memory layout 728 for the output 724 {out} is different from the inputs 722 {x, y}.

A transpose operation type 730 consumes an input 732 {x} and produces an output 734 {out}. The expected consumer memory layout 736 for the input 732 {x} is the current memory layout of the output 734 {out}. The expected producer memory layout 738 for the output 734 {out} is the current memory layout of the input 732 {x}.

A binary addition operation type 740 consumes two inputs 742 {a, b} and produces an output 744 {out}. The expected consumer memory layouts 746 for both the inputs 742 {a, b} are the current memory layout of the output 744 {out}. The expected producer memory layout 748 for the output 744 {out} is the majority vote that picks the most common current memory layout of the inputs 742 {a, b}. In the event of a tie break, the first defined current memory layout between the inputs 742 {a, b} is used.

Figure 8:
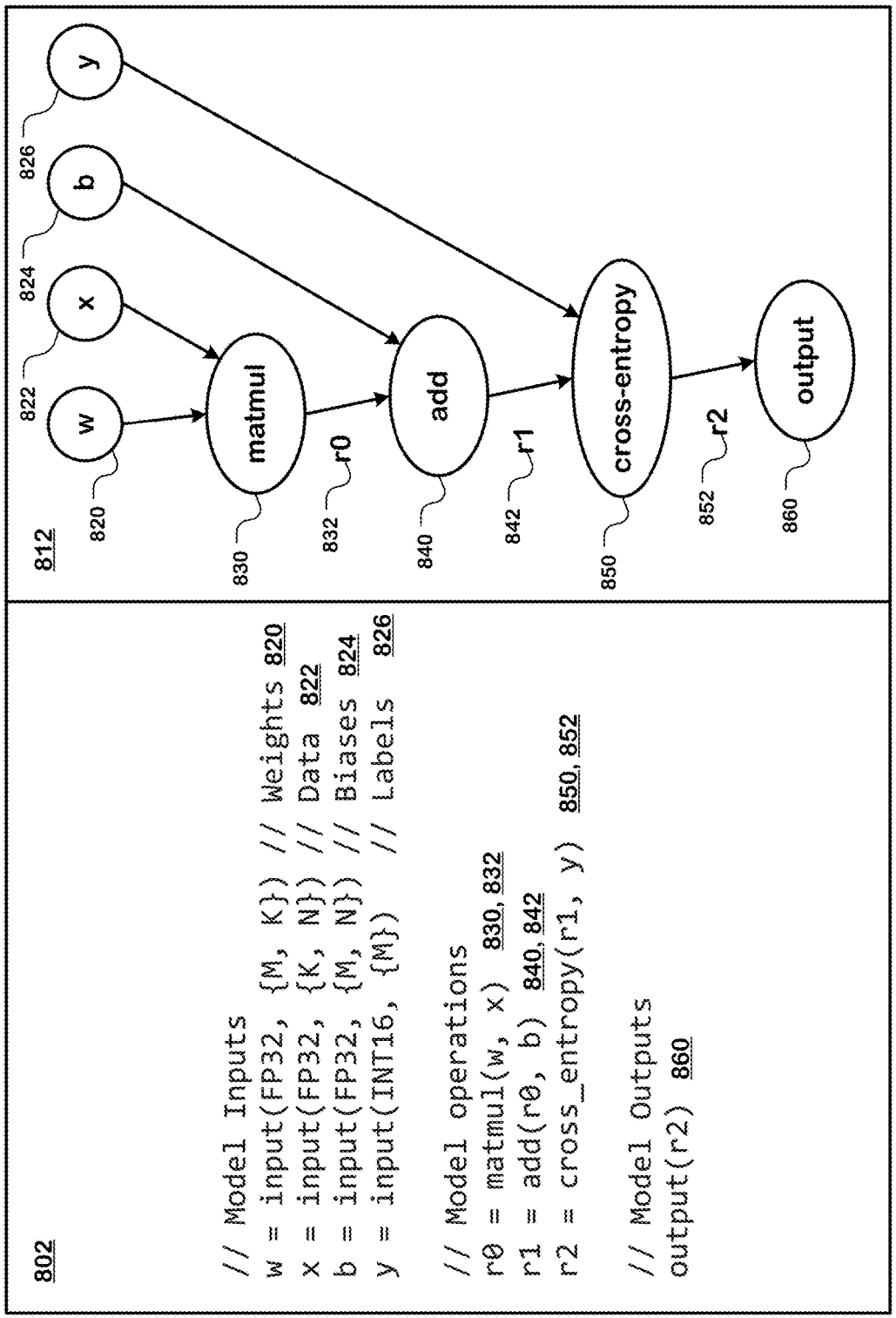
FIG. 8 illustrates an example dataflow graph for which the disclosed compile time logic determines tensor memory layouts, and detects and resolves conflicts between the tensor memory layouts.
Figure 10:
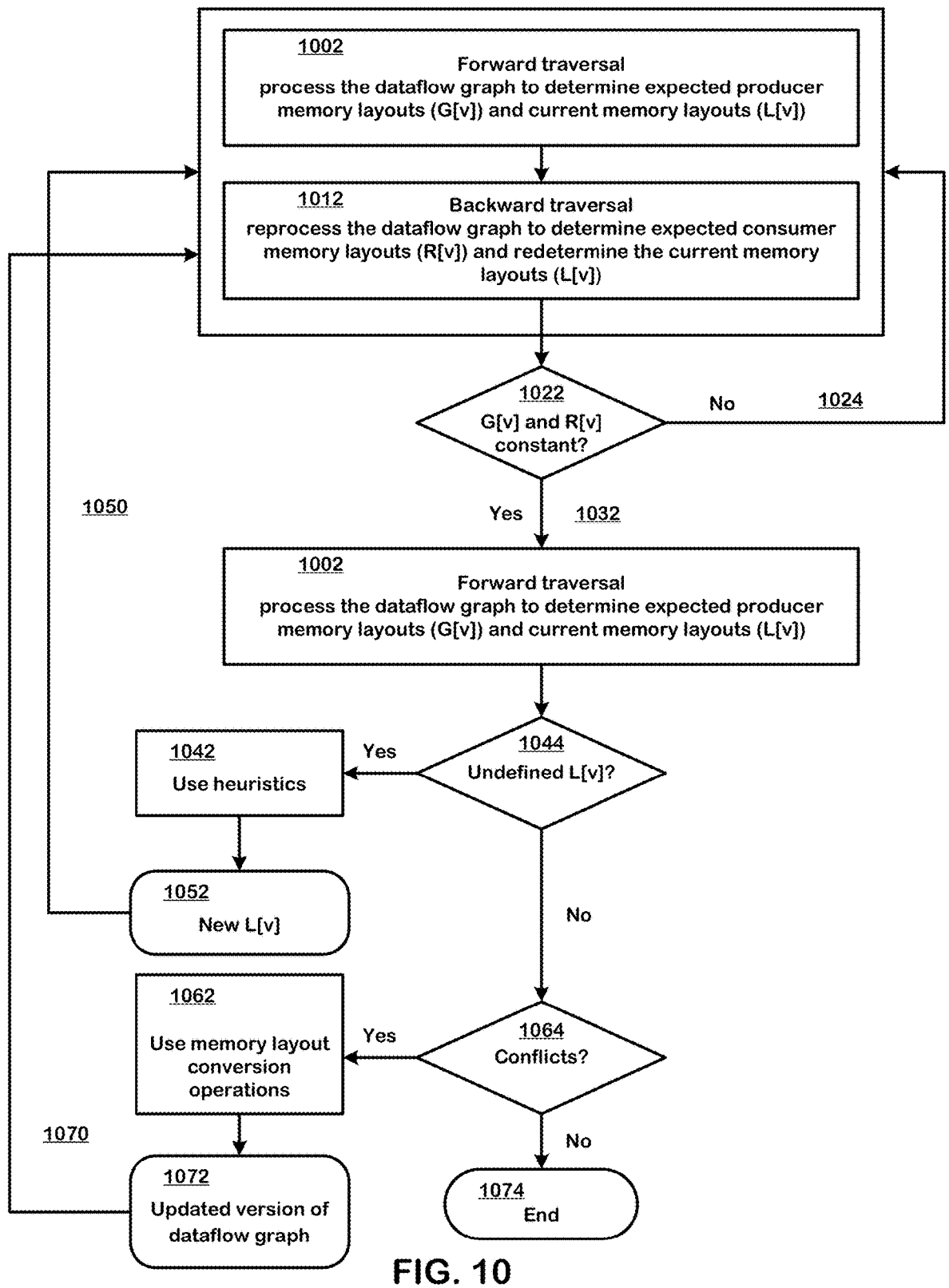
FIG. 10 is a flowchart of determining tensor memory layouts, and detecting and resolving conflicts between the tensor memory layouts.

FIG. 8 illustrates an example dataflow graph 800 for which the compile time logic 110 determines final memory layouts 274. FIG. 9 depicts forward traversal logic 902, backward traversal logic 916, and undefined and conflicted memory layout detection logic 930 used by the compile time logic 110 to determine the final memory layouts 274. FIG. 10 is a flowchart executing actions to determine the final memory layouts 274.

FIG. 8 provides a code view 802 and a graph view 812 of the dataflow graph 800. The dataflow graph 800 implements a logistic regression function for a dependent variable y 826 using an independent variable x 822. The dataflow graph 800 has weights 820 and biases b 824. The weights 820 are the multiplier and the independent variable x 822 is the multiplicand. A matrix multiplication operation unit 830 multiplies the weights 820 with the independent variable x 822 to produce an output (r0) 832. A binary addition operation unit 840 sums the output (r0) 832 with the biases b 824 to produce an output (r1) 842. A cross-entropy operation unit 850 calculates a cross-entropy loss (r2) 852 using the output (r1) 842 and the dependent variable y 826. An output operation unit 860 makes the cross-entropy loss (r2) 852 available for further processing.

The compile time logic 110 further comprises a forward traverser 222. The forward traverser 222 is configured with the forward traversal logic 902. The compile time logic 110 further comprises a backward traverser 224. The backward traverser 224 is configured with the backward traversal logic 916. An initializer 238 initializes three memory layout maps, namely, a producer memory layout map (G[v]) 232, a current memory layout map (L[v]) 234, and a consumer memory layout map (R[v]) 236. The producer memory layout map G[v] 232 identifies producer memory layouts for producer operation units in the dataflow graph 800. The current memory layout map L[v] 234 identifies current memory layouts for producer and consumer operation units in the dataflow graph 800. The consumer memory layout map R[v] 236 identifies consumer memory layouts for consumer operation units in the dataflow graph 800.

A forward traversal instance 1002 (also called forward processing herein), implemented by the forward traverser 222 using the forward traversal logic 902, processes the dataflow graph 800 in a forward traversal 904, starting from a first operation unit and progressing to successive operation units, to determine the expected producer memory layouts 908 for the producer memory layout map G[v] 232 using the memory layout functions 906, and the current memory layouts for the current memory layout map L[v] 234 based on the expected producer memory layouts 908. The forward traverser 222 propagates tensor memory layout information along edges in the dataflow graph 800 in a forward/top-down direction. In this phase, every operation sets its produced output memory layout based on its inputs, as illustrated by the forward traversal logic 902.

In one implementation, the forward traverser 222, using the forward traversal logic 902, is further configured to determine the current memory layouts for the current memory layout map L[v] 234 based on a redetermination of the current memory layouts in a prior backward traversal 910. In another implementation, the forward traverser 222, using the forward traversal logic 902, is further configured to determine the current memory layouts for the current memory layout map L[v] 234 based on a determination of the expected producer memory layouts in a prior forward traversal 912.

In some implementations, the current memory layout map L[v] 234 is determined based on which of the expected producer memory layouts 908, the redetermination of the current memory layouts in the prior backward traversal 910, and the determination of the expected producer memory layouts in the prior forward traversal 912 was first defined 914.

A backward traversal instance 1012 (also called backward reprocessing herein), implemented by the backward traverser 224 using the backward traversal logic 916, reprocesses the dataflow graph 800 in a backward traversal 918, starting from a last operation unit and progressing to preceding operation units, to determine the expected consumer memory layouts 922 for the consumer memory layout map R[v] 236 using the memory layout functions 920, and redetermine the current memory layouts for the current memory layout map L[v] 234 based on the expected consumer memory layouts 922. In some implementations, a given producer feeds tensors to multiple consumers that implement a variety of operation types. A list 924 of the expected consumer memory layouts 922 is determined using the corresponding operation-specific memory layout functions 920 for respective ones of the consumers and incorporated in the consumer memory layout map R[v] 236. The backward traverser 224 propagates tensor memory layout information along edges in the dataflow graph 800 in a backward/bottom-up direction. This phase computes a required memory layout for every tensor in the dataflow graph 800 from a simple majority vote 928 across its consumers, as illustrated by the backward traversal logic 916.

An undefined and conflicted memory layout detector 242, using the undefined and conflicted memory layout detection logic 930, is configured to process the dataflow graph 800 to detect undefined instances 932 of the current memory layouts. In one implementation, the undefined and conflicted memory layout detector 242 is further configured to use a set of heuristics 252 to assign the memory layouts to the undefined instances 932 of the current memory layouts. The heuristics in the set of heuristics 252 are based on tensor rank (or dimensionality). The heuristics 252 are done to set the memory layout of a graph-level input or output. Graph inputs and outputs are heuristically set based on their respective tensor rank (or dimensionality). For example, one-dimensional (1D) tensors, i.e., tensors of rank one, are heuristically set in the DRAM with a memory layout of "C/{C}/{C:1}," while tensors of other ranks are heuristically set in the DRAM with a memory layout of "{R}/{C, R}/{R:VL}, where VL is the hardware's single instruction, multiple data (SIMD) vector width.

The undefined and conflicted memory layout detector 242, using the undefined and conflicted memory layout detection logic 930, is further configured to detect memory layout conflicts when the expected consumer memory layouts are different from corresponding ones of the expected producer memory layouts 934, and to resolve the memory layout conflicts by modifying the dataflow graph 800 to cause the expected consumer memory layouts to match the corresponding ones of the expected producer memory layouts. The undefined and conflicted memory layout detector 242, using the undefined and conflicted memory layout detection logic 930, is further configured to detect the memory layout conflicts when the expected consumer memory layouts are different from corresponding ones of the current memory layouts, and to resolve the memory layout conflicts by modifying the dataflow graph 800 to cause the expected consumer memory layouts to match the corresponding ones of the current memory layouts.

In some implementations, the undefined and conflicted memory layout detector 242 is further configured to detect multiple instances of the memory layout conflicts, and to resolve the multiple instances of the memory layout conflicts by using memory layout conversion operations 262. In some implementations, the memory layout conversion operations 262 include a transpose operation that modifies the current memory layouts by changing the vector dimension of corresponding ones of the tensors. In other implementations, the memory layout conversion operations 262 include a shuffle operation that modifies the current memory layouts by changing the vector ordering of the corresponding ones of the tensors. In yet other implementations, the memory layout conversion operations 262 include a realignment operation that modifies the current memory layouts by changing the data alignment of the corresponding ones of the tensors.

A controller 272 is further configured to iterate the forward processing 1002 and the backward reprocessing 1012 of the dataflow graph 800 until convergence. The convergence occurs when the expected producer memory layouts G[v] and the expected consumer memory layouts R[v] remain constant between iterations, i.e., between the forward processing 1002 and the backward reprocessing 1012 of a same iteration. The forward processing 1002 and the backward reprocessing 1012 of the dataflow graph 800 continues 1024 as long as no memory layouts in the producer memory layout map G[v] 232 and the consumer memory layout map R[v] 236 change between the forward processing 1002 and the backward reprocessing 1012 (i.e., G[v] 232 and R[v] 236 are NOT constant), as determined by a check 1022.

If the memory layouts in the producer memory layout map G[v] 232 and the consumer memory layout map R[v] 236 do NOT change between the forward processing 1002 and the backward reprocessing 1012 (i.e., G[v] 232 and R[v] 236 are constant), then the forward processing 1002 is executed at least one more time 1032 to update the current memory layout map L[v] 234.

Then, the undefined instances 932 in the current memory layout map L[v] 234 are detected in 1044 and assigned memory layouts in 1042 using the heuristics 252. The heuristics-based memory layout assignment 1042 updates 1052 the current memory layout map L[v] 234, and, as a result, the dataflow graph 800 is again via 1050 subjected to the forward processing 1002 and the backward reprocessing 1012.

After all the undefined instances 932 of the current memory layouts are eliminated, the dataflow graph 800 is inspected 1064 for the memory layout conflicts. If memory layout conflicts are detected, then the memory layout conversion operations 1062 are inserted in the dataflow graph 800 and uses action 1062 for resolution. The insertion of the memory layout conversion operations 1062 generates 1072 an updated version of the dataflow graph 800. The updated version of the dataflow graph 800 is again via 1070 subjected to the forward processing 1002 and the backward reprocessing 1012, and to the inspection of undefined memory layouts and conflict-causing memory layouts, and resolution thereof, as discussed above.

If no memory layout conflicts are detected, then the final memory layouts 274 are produced as output 1074 and made available for further downstream processing or use.

The following discussion uses the dataflow graph 800 as an example to illustrate various aspects of the layout determination, conflict detection, and conflict resolution algorithm discussed above.

FIG. 11 illustrates initialization 1100 of the three memory layout maps for the operation units/nodes in the dataflow graph 800 to unknown memory layouts (?), namely, the producer memory layout map G[v] 232, the current memory layout map L[v] 234, and the consumer memory layout map R[v] 236. In the dataflow graph 800, since each value/tensor has only one consumer, we can simplify the consumer memory layout map R[v] 236 to contain, for an individual tensor, only one consumer memory layout for the corresponding, single consumer, as opposed to maintaining consumer memory layouts for multiple consumers that consume the individual tensor. Accordingly, the backward traversal step 1012 for the current memory layout map L[v] 234 then becomes L[v] 234=the consumer memory layout map R[v]

236. A person skilled in the art will appreciate that the implementation for the multiple consumers can be implemented as an extension of the single consumer implementation, as described above with respect to the backward traversal logic 916.

FIG. 12 depicts a first forward traversal 1200 of the dataflow graph 800, using each operation unit's corresponding memory layout functions to update the producer memory layout map G[v] 232 and the current memory layout map L[v] 234. The input operation units, namely, w 820, x 222, b 824, and y 826 have a memory layout function that assigns them an unknown memory layout (?). The first forward traversal 1200 processes the dataflow graph 800 in the forward/top-down direction 1202, 1212, 1222, 1232, 1242, 1252, and 1262, starting from a first/top-most operation unit (w 820) and progressing to successive operation units (x 222 to b 824 to y 826 to r0 832 to r1 842 to r2 852), to determine the expected producer memory layouts 908 for the producer memory layout map G[v] 232 using the memory layout functions 906, and the current memory layouts for the current memory layout map L[v] 234 based on the expected producer memory layouts 908.

FIG. 13 shows the first forward traversal map 1300 generated as a result of the first forward traversal 1200. In the first forward traversal map 1300, the producer memory layout map G[v] 232 is updated with respect to the tensors r0 832, r1 842, and r2 852 to have producer memory layouts 1302, 1304, and 1306, respectively. Also, in the first forward traversal map 1300, the current memory layout map L[v] 234 is also updated with respect to the tensors r0 832, r1 842, and r2 852 to have current memory layouts 1312, 1314, and 1316, respectively.

FIG. 14 depicts a first backward traversal 1400 of the dataflow graph 800, using each operation unit's corresponding memory layout functions to update the consumer memory layout map R[v] 236 and reupdate the current memory layout map L[v] 234. Note that an output node's, i.e., a consumer's expected memory layout is always the current memory layout of its input. The first backward traversal 1400 processes the dataflow graph 800 in the backward/bottom-up direction 1402, 1412, 1422, and 1432, starting from the last/bottom-most operation unit (r2 852) and progressing to preceding operation units (r1 842 to r0 832 to y 826 to b 824 to x 222 to w 820), to determine the expected consumer memory layouts 922 for the consumer memory layout map R[v] 236 using the memory layout functions 920, and redetermine the current memory layouts for the current memory layout map L[v] 234 based on the expected consumer memory layouts 922.

FIG. 15 shows the first backward traversal map 1500 generated as a result of the first backward traversal 1400. In the first backward traversal map 1400, the consumer memory layout map R[v] 236 is updated with respect to the tensors w 820, x 222, b 824, y 826, r0 832, r1 842, and r2 852 to have consumer memory layouts 1502, 1504, 1506, 1508, 1510, 1512, and 1514, respectively. Also, in the first backward traversal map 1500, the current memory layout map L[v] 234 is reupdated with respect to the tensors w 820, x 222, b 824, y 826, r0 832, and r1 842 to have current memory layouts 1522, 1524, 1526, 1528, 1530, and 1532, respectively.

Since there have been changes to the consumer memory layout map R[v] 236 and the producer memory layout map G[v] 232 between the first backward traversal 1400 and the first backward traversal map 1500, we run the forward and backward pass again.

FIG. 16 depicts a second forward traversal 1600 of the dataflow graph 800, using each operation unit's corresponding memory layout functions to again update the producer memory layout map G[v] 232 and the current memory layout map L[v] 234. The second forward traversal 1600 also processes the dataflow graph 800 in the forward/top-down direction 1602, 1612, 1622, 1632, 1642, 1652, and 1662, starting from the first/top-most operation unit (w 820) and progressing to the successive operation units (x 222 to b 824 to y 826 to r0 832 to r1 842 to r2 852), to again determine the expected producer memory layouts 908 for the producer memory layout map G[v] 232 using the memory layout functions 906, and the current memory layouts for the current memory layout map L[v] 234 based on the expected producer memory layouts 908.

FIG. 17 shows the second forward traversal map 1700 generated as a result of the second forward traversal 1700. In the second forward traversal map 1700, the current memory layout map L[v] 234 is updated with respect to the tensors r0 832, and r1 842 to have current memory layouts 1702 and 1704, respectively.

FIG. 18 depicts a second backward traversal 1800 of the dataflow graph 800, using each operation unit's corresponding memory layout functions to update the consumer memory layout map R[v] 236 and reupdate the current memory layout map L[v] 234. Note that an output node's, i.e., a consumer's expected memory layout is always the current memory layout of its input. The second backward traversal 1800 processes the dataflow graph 800 in the backward/bottom-up direction 1802, 1812, 1822, and 1832, starting from the last/bottom-most operation unit (r2 852) and progressing to preceding operation units (r1 842 to r0 832 to y 826 to b 824 to x 222 to w 820), to determine the expected consumer memory layouts 922 for the consumer memory layout map R[v] 236 using the memory layout functions 920, and redetermine the current memory layouts for the current memory layout map L[v] 234 based on the expected consumer memory layouts 922.

FIG. 19 shows the second backward traversal map 1900 generated as a result of the second backward traversal 1900. In the second backward traversal map 1900, the current memory layout map L[v] 234 is updated with respect to the tensors r0 832, and r1 842 to have current memory layouts 1902 and 1904, respectively.

Note that now, between the second forward traversal 1600 and the second backward traversal 1800, even though the current memory layout map L[v] 234 has changed, the consumer memory layout map R[v] 236 and the producer memory layout map G[v] 232 have not changed. Therefore, now we have reached a convergence point. We now run the forward pass once more to find that the current memory layout map L[v] 234 is again updated with respect to the tensors r0 832, and r1 842 to have current memory layouts 2042 and 2044, respectively.

Since there are no undefined current memory layouts in this example, i.e., L[v]?, we now compute whether there are any over-constrained memory layouts, also called conflicted memory layouts or conflicts, i.e., R[v] L[v]. We find that, for tensor r0 832, the R[v] memory layout 1510 does not match with the L[v] memory layout 2042, i.e., conflict 2010. We also find that, for tensor r1 842, the R[v] memory layout 1512 does not match with the L[v] memory layout 2044, i.e., conflict 2012.

The conflicts 2010 and 2012 result from the fact that we have a matrix multiply kernel 830 which always produces a tensor vectorized on the row (R) dimension, but we have a downstream consumer (the cross-entropy kernel 850) that always expects a tensor vectorized on the column (C) dimension. This is a mismatch, in the sense that we must insert a transformation to make this program work. The analysis has isolated in two places where the transformation can be inserted, either between the matrix multiply kernel 930 and the binary addition kernel 840, or between the binary addition kernel 840 and the cross-entropy kernel 850. In one implementation, we heuristically choose the first kernel in forward traversal order. The mismatch is a mismatch on vector dimension, so we insert a physical transpose 2122 at the chosen location to resolve the conflicts 2010 and 2012.

Figure 21:
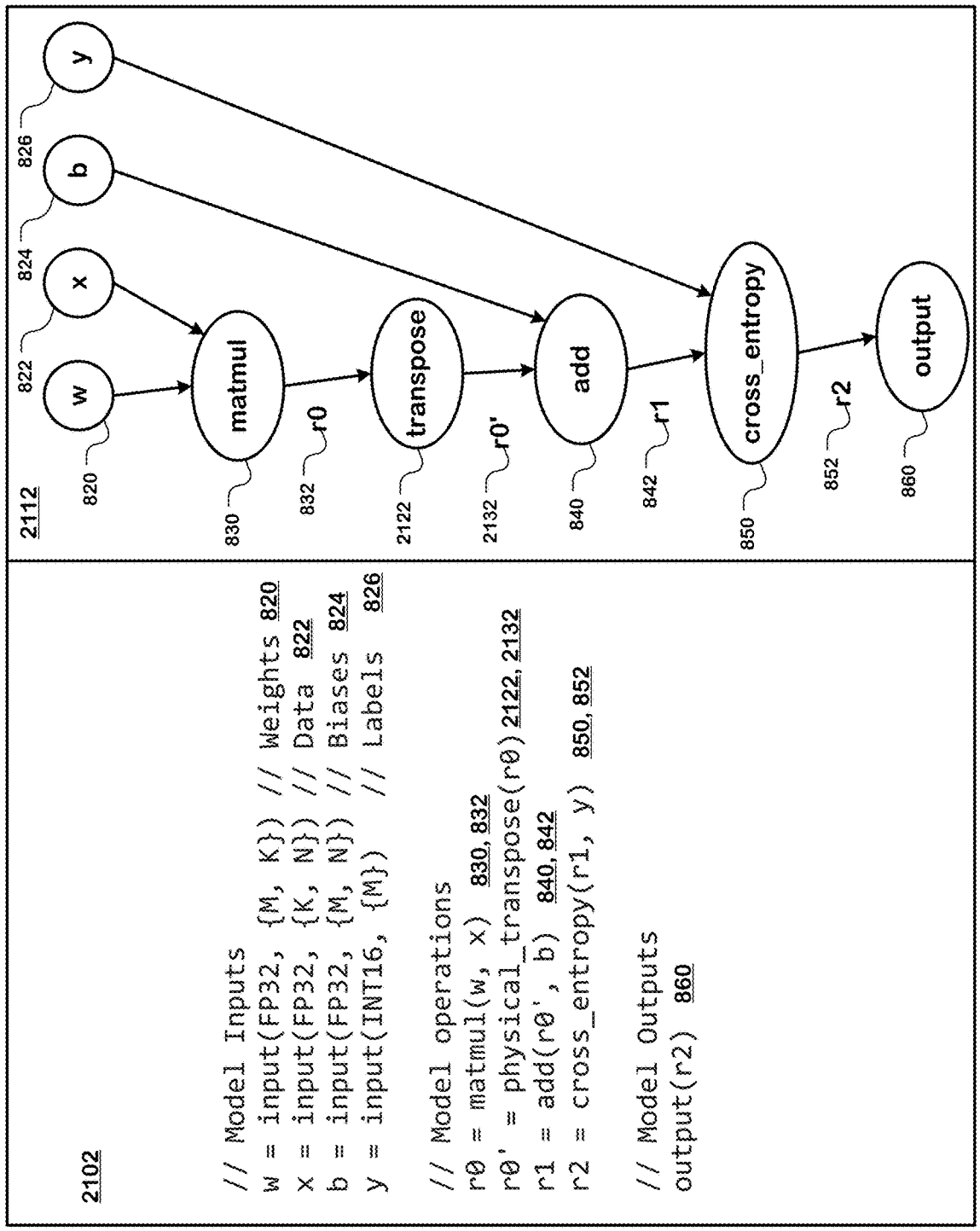
FIG. 21 illustrates one implementation of resolving the memory layout conflicts detected in FIG. 20 by using a transpose operation, and generating an updated version of the dataflow graph.

As a result, we have an updated dataflow graph 2100 in which the transpose operation 2122 generates tensor r0' 2132. The transpose operation 2122 is inserted between the matrix multiply kernel 830 and the binary addition kernel 840. FIG. 21 shows a code view 2102 of the updated dataflow graph 2100 and a graph view 2112 of the updated dataflow graph 2100.

We now repeat the entire process again, accounting for the fact that we have added a new node to our graph.

FIG. 22 depicts a first forward traversal 2200 of the updated dataflow graph 2100, using each operation unit's corresponding memory layout functions to update the producer memory layout map G[v] 232 and the current memory layout map L[v] 234. The input operation units, namely, w 820, x 222, b 824, and y 826 have a memory layout function that assigns them an unknown memory layout (?). The first forward traversal 2200 processes the updated dataflow graph 2100 in the forward/top-down direction 2202, 2212, 2222, 2232, 2242, 2252, 2262 and 2272, starting from a first/topmost operation unit (w 820) and progressing to successive operation units (x 222 to b 824 to y 826 to r0 832 to r1 842 to r2 852), to determine the expected producer memory layouts 908 for the producer memory layout map G[v] 232 using the memory layout functions 906, and the current memory layouts for the current memory layout map L[v] 234 based on the expected producer memory layouts 908.

FIG. 23 shows the first forward traversal map 2300 generated as a result of the first forward traversal 22. In the first forward traversal map 2300, the producer memory layout map G[v] 232 is updated with respect to the tensors r0' 2302 and r1 842 to have producer memory layouts 2322 and 2324, respectively. Also, in the first forward traversal map 2300, the current memory layout map L[v] 234 is also updated with respect to the tensors r0' 2302 and r1 842 to have current memory layouts 2332 and 2334, respectively. Also note that the tensor r0' 2302 has an undefined consumer memory layout (?) 2312 in the consumer memory layout map R[v] 236.

FIG. 24 shows the first backward traversal map 2400 generated as a result of the first backward traversal of the updated dataflow graph 2100 (not shown). In the first backward traversal map 1400 of the updated dataflow graph 2100, the consumer memory layout map R[v] 236 is updated with respect to the tensors r0 832 and r0' 2302 to have consumer memory layouts 2402 and 2404, respectively.

After this point, the method as outlined above will run the forward and backward once more to confirm convergence. It will then update the layouts again by running the forward once more, confirm that there are no longer any mismatches or undefined layouts, and complete. As shown in FIG. 25, the final selected layouts 274 for this graph are then be annotated using graph metadata 2502, which shows memory layout metadata 2504, 2506, 2508, 2510, 2512, 2514, 2516, 2518, and 2520 stored in the maps discussed above.

Figure 26:
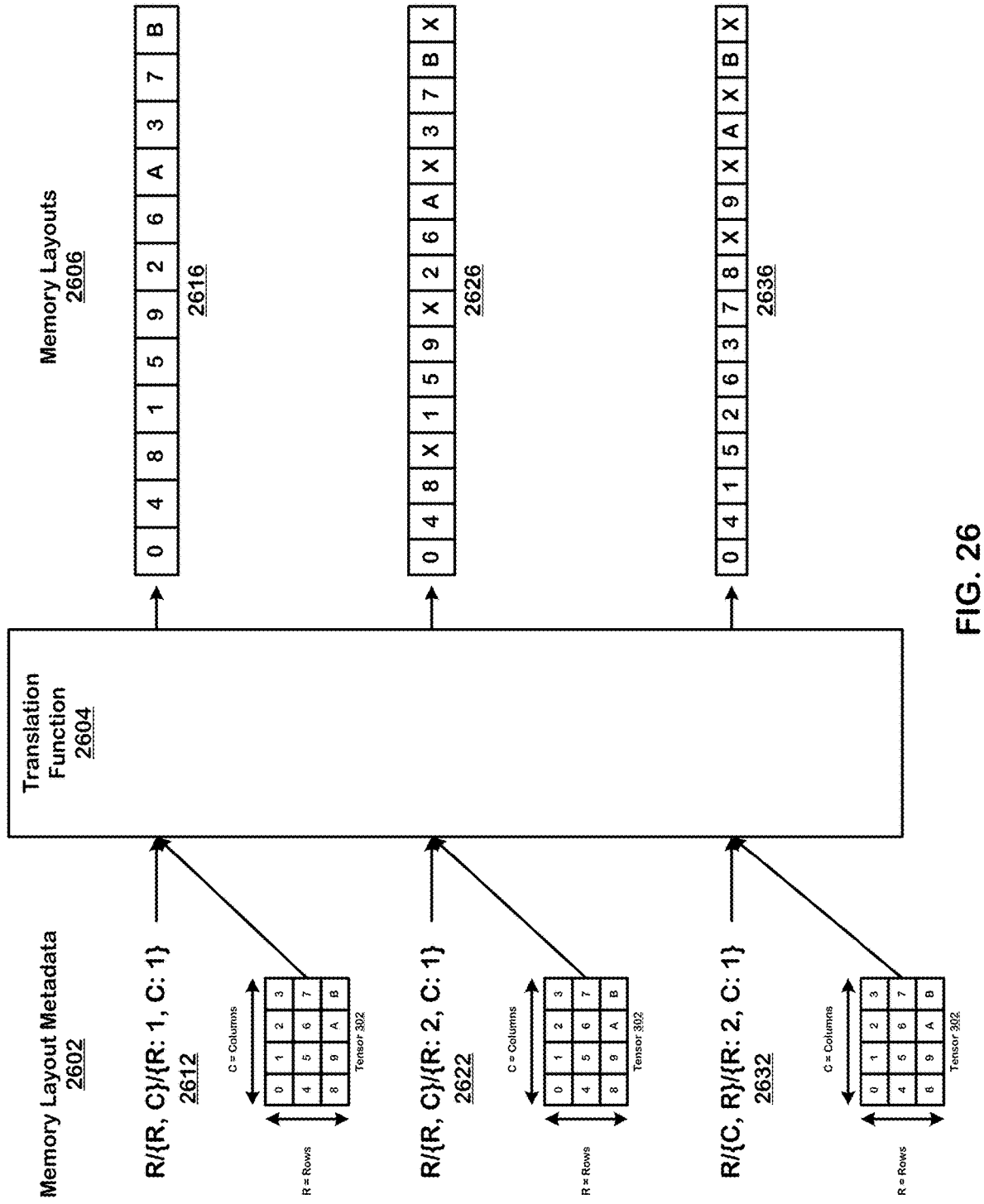
FIG. 26 shows one implementation of a translation function that translates memory layout metadata into memory layouts.

In FIG. 26, the memory layout metadata 2602 (e.g., 2612, 2622, 2632) is fed to a translation function 2604 along with the underlying tensor (e.g., tensor 302) to retrieve the memory layouts 2606 (e.g., 2616, 2626, 2636).

In some implementations, runtime logic 114 is configured to allocate physical compute units and physical memory units of a reconfigurable processor in the pool of reconfigurable data flow resources 116 to the updated version of the dataflow graph. In other implementations, the runtime logic 114 is configured to execute the update version of the dataflow graph on the reconfigurable processor based on the allocation.

The technology disclosed can be applied on, used in, and adapted to a variety of processors such as central processing unit (CPUs), graphics processing units (GPUs), field programmable gate arrays (FPGAs), coarse-grained reconfigurable architectures (CGRAs), and application-specific integrated circuits (ASICs).

Figure 27:
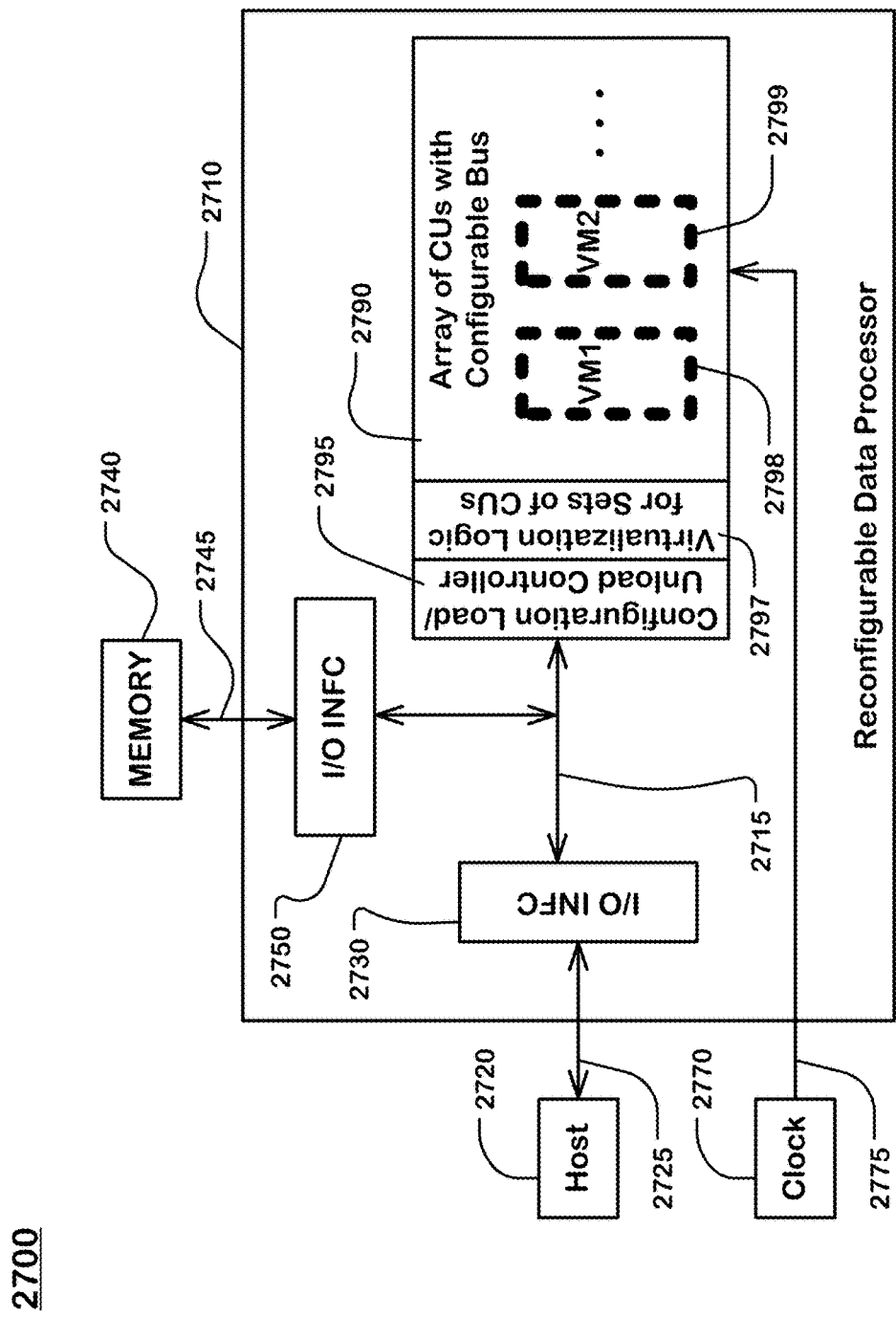
FIG. 27 is a system diagram illustrating a system including a host, a memory, and an example reconfigurable data processor on which the technology disclosed can be applied.

FIG. 27 is a diagram illustrating a system 2700 including a host 2720, a memory 2740, and an example reconfigurable data processor 2710 in which a computation unit as described herein is deployed by hardware or by configuration of reconfigurable components and configured with the virtualization logic 2797. As shown in the example of FIG. 27, the reconfigurable data processor 2710 includes an array 2790 of configurable units and a configuration load/unload controller 2795.

The virtualization logic 2797 can include resources that support or enable simultaneous execution of multiple, unrelated application graphs (or related ones) in an array of configurable units on one die or one multichip module. In the illustration, a first application graph is implemented in virtual machine VM1 in a particular set 2798 of configurable units, and a second application graph is implemented in virtual machine VM2 in another set 2799 of configurable units.

Figure 30:
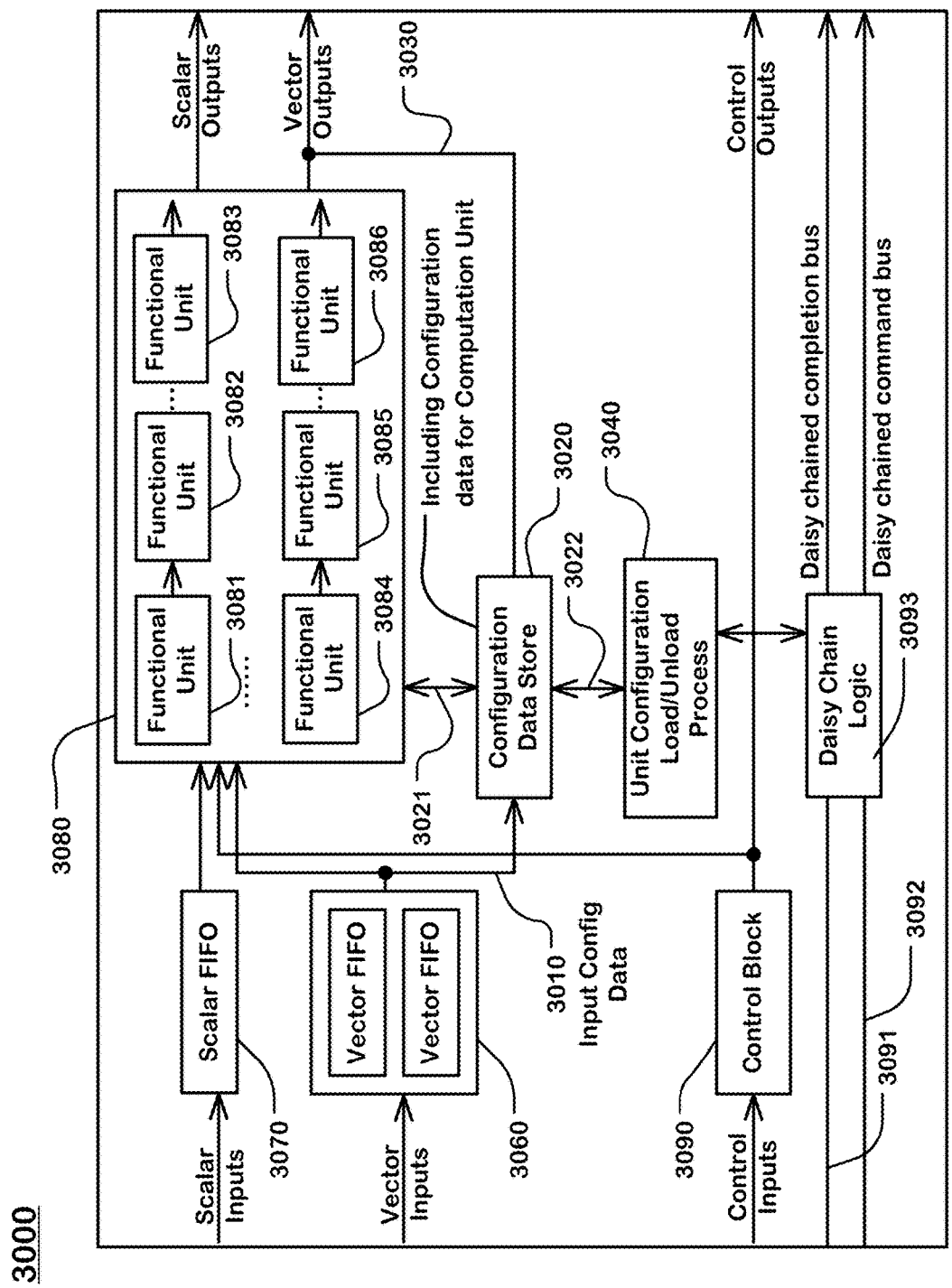
FIG. 30 is a block diagram illustrating an example configurable unit, such as a Pattern Compute Unit (PCU).
Figure 31:
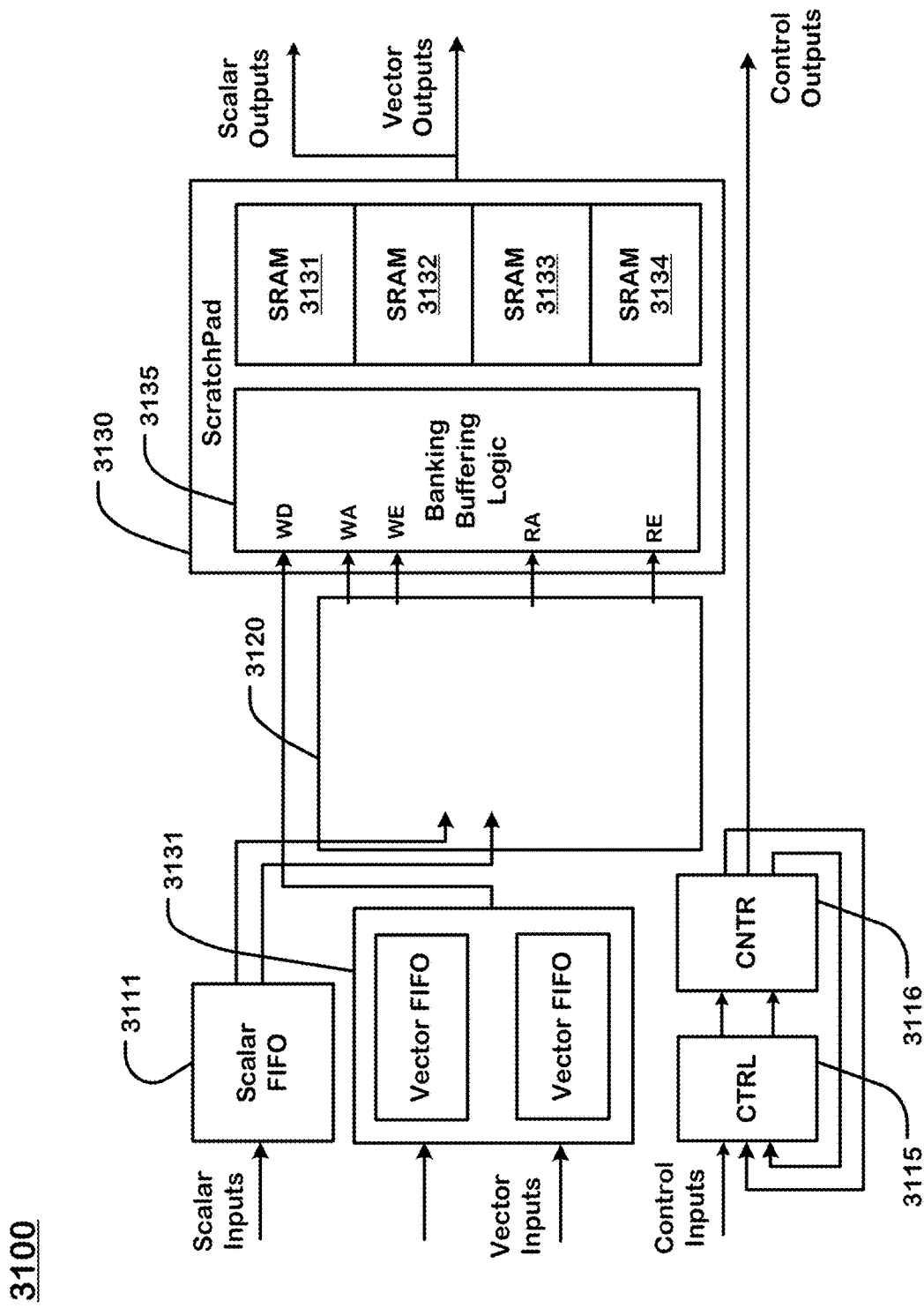
FIG. 31 is a block diagram illustrating an example configurable unit, such as a Pattern Memory Unit (PMU).

Configurable units in an array 2790 of configurable units are further described in reference to FIGS. 30 and 31 and configured with the virtualization logic 2797. Configurable units can include, or can have units configured to implement, a computation unit or computation units, as described herein.

The processor 2710 includes an external I/O interface 2730 connected to the host 2720 by line 2725, and an external I/O interface 2750 connected to the memory 2740 by line 2745. The I/O interfaces 2730, 2750 connect via a bus system 2715 to the array 2790 of configurable units and to the configuration load/unload controller 2795. The bus system 2715 may have a bus width of carrying one chunk of data, which can be for this example one hundred and twenty-eight bits (references to one hundred and twenty-eight bits throughout can be considered as an example chunk size more generally).

To configure configurable units in the array 2790 of configurable units with a configuration file, the host 2720 can send the configuration file to the memory 2740 via the interface 2730, the bus system 2715, and the interface 2750 in the reconfigurable data processor 2710. The configuration file can be loaded in many ways, as suits a particular architecture, including in data paths outside the configurable processor 2710. The configuration file can be retrieved from the memory 2740 via the memory interface 2750. Chunks of the configuration file can then be sent in a distribution sequence to configurable units in the array 2790 of configurable units in the reconfigurable data processor 2710.

An external clock generator 2770 or other clock line sources can provide a clock line 2775 or clock lines to elements in the reconfigurable data processor 2710, including the array 2790 of configurable units, and the bus system 2715, and the external data I/O interfaces. The bus system 2715 can communicate data at a processor clock rate via a clock line 2775 or clock lines.

Figure 28:
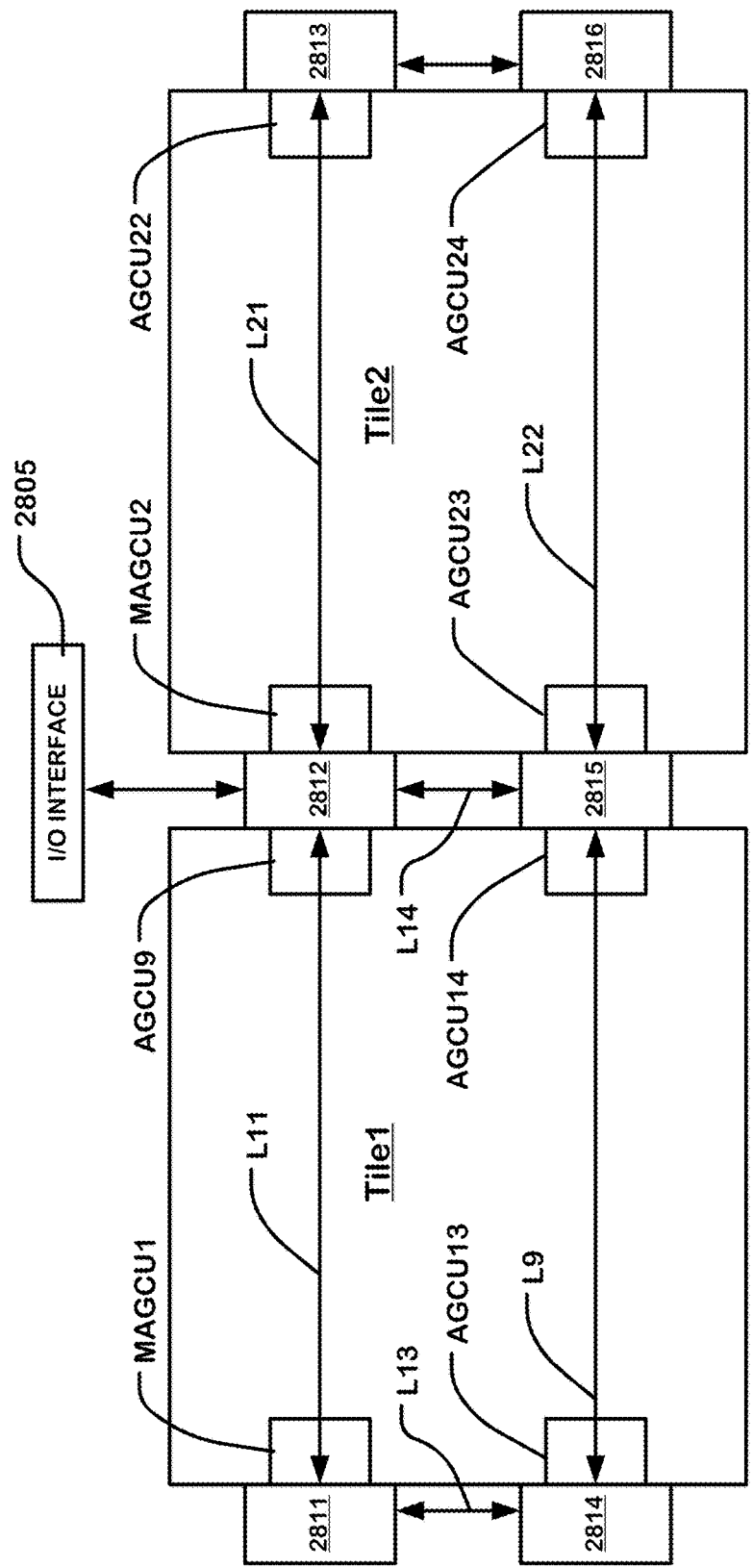
FIG. 28 is a simplified block diagram of a top-level network and components of a CGRA (Coarse Grain Reconfigurable Architecture).

FIG. 28 is a simplified block diagram 2800 of components of a CGRA (coarse-grained reconfigurable architecture) processor. In this example, the CGRA processor has two tiles (Tile1, Tile2). The tile comprises an array of configurable units connected to a bus system, including array level networks in this example. An array of configurable units (e.g., 2790, FIG. 27) in the tile includes computation units in hardware or by configuration of reconfigurable components, which are configured with the virtualization logic 2797. The bus system includes a top-level network connecting the tiles to external I/O interface 2805 (or any number of interfaces). In other embodiments, different bus system configurations may be utilized. The configurable units in each tile are nodes on the array level network in this embodiment.

Each of the tiles has four AGCUs (Address Generation and Coalescing Units) (e.g., MAGCU1, AGCU9, AGCU13, AGCU14). The AGCUs are nodes on the top-level network and nodes on the array level networks and include resources for routing data among nodes on the top-level network and nodes on the array level network in each tile.

Nodes on the top-level network in this example include one or more external I/Os, including interface 2805. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top-level switches (2811, 2813, 2814, and 2816) connecting to each other as well as to other nodes on the top-level network, including the AGCUs, and I/O interface 2805. The top-level network includes links (e.g., L11, L9, L21, L22) connecting the top-level switches. Data travels in packets between the top-level switches on the links, and from the switches to the nodes on the network connected to the switches. For example, top-level switches 2811 and 2812 are connected by a link L11, top-level switches 2814 and 2815 are connected by a link L9, top-level switches 2811 and 2814 are connected by a link L13, and top-level switches 2812 and 2813 are connected by a link L21. The links can include one or more buses and supporting control lines, including for example a chunk-wide bus (vector bus). For example, the top-level network can include data, request and response channels operable in coordination for transfer of data in a manner analogous to an AXI compatible protocol. See, AMBA® AXI and ACE Protocol Specification, ARM.

Top-level switches can be connected to AGCUs. For example, top-level switches 2811, 2812, 2814, and 2815 are connected to MAGCU1, AGCU9, AGCU13 and AGCU14 in the tile Tile1, respectively. Top-level switches 2812, 2813, 2815, and 2816 are connected to MAGCU2, AGCU22, AGCU23 and AGCU24 in the tile Tile2, respectively.

Top-level switches can be connected to one or more external I/O interfaces (e.g., interface 2805).

Figure 29B:
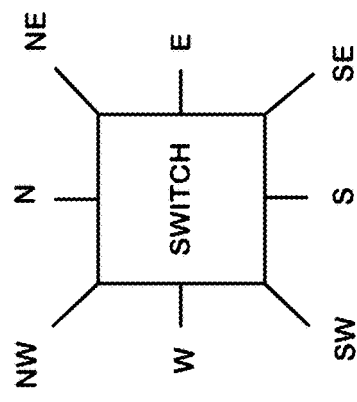
FIG. 29B illustrates an example switch unit connecting elements in an array level network.
Figure 29:
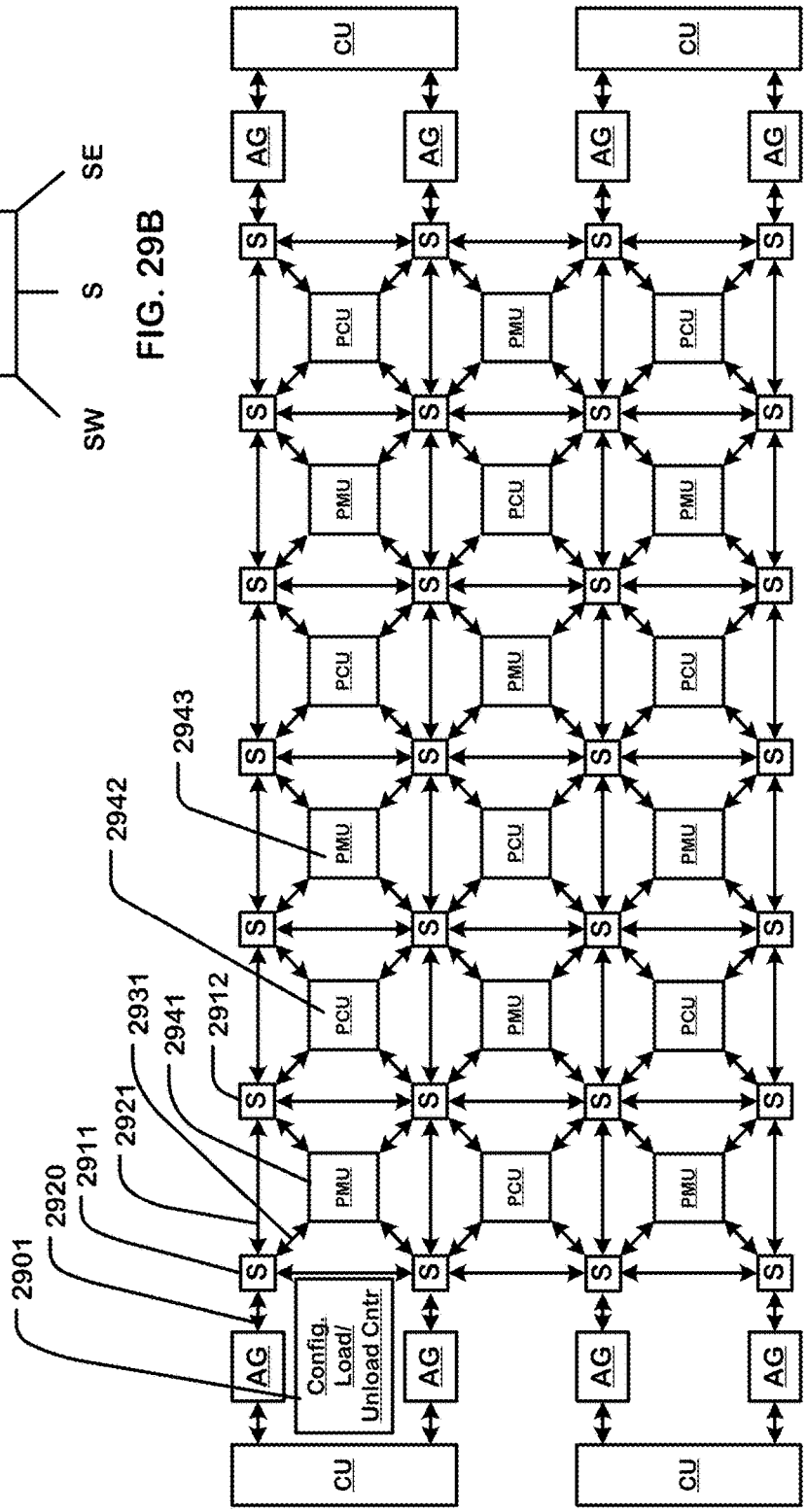
FIG. 29 is a simplified diagram of a tile and an array level network usable in the configuration of FIG. 27, where the configurable units are nodes on the array level network and are configurable to implement a lookup table with input offsetting.

FIG. 29 is a simplified diagram of a tile and an array level network usable in the configuration of FIG. 28, where the configurable units in the array are nodes on the array level network and are configurable to implement the virtualization logic 2797.

In this example, the array of configurable units 2900 includes a plurality of types of configurable units, which are configured with the virtualization logic 2797. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns," ISCA '17, Jun. 24-28, 2017, Toronto, ON, Canada, which is incorporated by reference as if fully set forth herein. In this example, the PCUs (e.g., 2942) and PMUs (e.g., 2943) in the array of configurable units 2900 can include resources configurable for embodiment of a computation unit, an example configuration of which is described herein. Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the virtualization logic 2797. Program Load may also require the load of all PMU memories.

The array level network includes links interconnecting configurable units in the array. The links in the array level network include one or more and, in this case, three kinds of physical buses: a chunk-level vector bus (e.g., one hundred and twenty-eight bits of data), a word-level scalar bus (e.g., thirty-two bits of data), and a multiple bit-level control bus. For instance, interconnect 2921 between switch units 2911 and 2912 includes a vector bus interconnect with a vector bus width of one hundred and twenty-eight bits, a scalar bus interconnect with a scalar bus width of thirty-two bits, and a control bus interconnect.

The three kinds of physical buses differ in the granularity of data being transferred. In one embodiment, the vector bus can carry a chunk that includes sixteen-Bytes (=one hundred and twenty-eight bits) of data as its payload. The scalar bus can have a thirty-two-bit payload and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing thirty-two bits per value and BF16 using sixteen bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of one hundred and twenty-eight bits. The header is transmitted on a header bus to each configurable unit in the array of configurable unit.

In one example, a chunk of data of one hundred and twenty-eight bits is transmitted on the vector bus that provides the chunk as vector inputs to a configurable unit. The vector bus can include one hundred and twenty-eight payload lines, and a set of header lines. The header can include a sequence ID for each chunk, which can include:
  A bit to indicate if the chunk is scratchpad memory or configuration store data.
  Bits that form a chunk number.
  Bits that indicate a column identifier.
  Bits that indicate a row identifier.
  Bits that indicate a component identifier.

For a load operation, the configuration load controller can send the number N of chunks to a configurable unit in order from N−1 to 0. If, for example, N=6, the chunks are sent out in most-significant-bit-first order of Chunk 5→Chunk 4→Chunk 3→Chunk 2→Chunk 1→Chunk 0. (Note that this most-significant-bit-first order results in Chunk 5 being distributed in round 0 of the distribution sequence from the array configuration load controller.) For an unload operation, the configuration unload controller can write the unload data out of order to the memory. For both load and unload operations, the shifting in the configuration serial chains in a configuration data store in a configurable unit is from LSB (least-significant-bit) to MSB (most-significant-bit), or MSB out first.

FIG. 29B illustrates an example switch unit connecting elements in an array level network. As shown in the example of FIG. 29B, a switch unit can have eight interfaces. The North, South, East and West interfaces of a switch unit are used for connections between switch units. The Northeast, Southeast, Northwest and Southwest interfaces of a switch unit are each used to make connections to PCU or PMU instances. A set of two switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the eight interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 2941 can be sent from the configuration load/unload controller 2901 to the PMU 2941, via a link 2920 between the configuration load/unload controller 2901 and the West (W) vector interface of the switch unit 2911, the switch unit 2911, and a link 2931 between the Southeast (SE) vector interface of the switch unit 2911 and the PMU 2941.

In this example, one of the AGCUs is configured to be a master AGCU, which includes a configuration load/unload controller (e.g., 2901). The master AGCU implements a register through which the host (2720, FIG. 27) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 30). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example one hundred and twenty-eight bits of configuration data from the master AGCU in one bus cycle, the configurable unit shifts this data through its serial chain at the rate of one bit per cycle, where shifter cycles can run at the same rate as the bus cycle. It will take one hundred and twenty-eight shifter cycles for a configurable unit to load one hundred and twenty-eight configuration bits with the one hundred and twenty-eight bits of data received over the vector interface. The one hundred and twenty-eight bits of configuration data are referred to as a chunk. A configurable unit can require multiple chunks of data to load all its configuration bits.

The configurable units interface with the memory through multiple memory interfaces (2750, FIG. 27). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

FIG. 30 is a block diagram illustrating an example configurable unit 3000, such as a Pattern Compute Unit (PCU), which is configured with the virtualization logic 2797. A configurable unit can interface with the scalar, vector, and control buses, in this example using three corresponding sets of inputs and outputs (TO): scalar inputs/outputs, vector inputs/outputs, and control inputs/outputs. Scalar IOs can be used to communicate single words of data (e.g., thirty-two bits). Vector IOs can be used to communicate chunks of data (e.g., one hundred and twenty-eight bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 3090, and control outputs are provided by the control block 3090.

Each vector input is buffered in this example using a vector FIFO in a vector FIFO block 3060 which can include one or more vector FIFOs. Likewise, in this example, each scalar input is buffered using a scalar FIFO 3070. Using input FIFOs decouples timing between data producers and consumers and simplifies inter-configurable-unit control logic by making it robust to input delay mismatches.

A configurable unit includes multiple reconfigurable data paths in block 3080. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 3020 is connected to the multiple data paths in block 3080 via lines 3021.

A configurable data path organized as a multi-stage pipeline can include multiple functional units (e.g., 3081, 3082, 3083, 3084, 3085, 3086) at respective stages. A computation unit or parts of a computation unit can be implemented in multiple functional units at respective stages in a multi-stage pipeline or in multiple multi-stage pipelines. In the example as shown in FIG. 9, a circuit including the virtualization logic 2797 can be implemented in multiple functional units and multiple memory units. Input registers in functional units can register inputs from scalar FIFOs 3070 or Vector FIFOs 3060 or from previous stages in a multi-stage pipeline. A functional unit at a stage in a multi-stage pipeline can execute a function, e.g., logical shift, an arithmetic function, comparison, a logical operation, etc., and generate an output.

Configurable units in the array of configurable units include configuration data stores 3020 (e.g., serial chains) to store unit files comprising a plurality of chunks (or sub-files of other sizes) of configuration data particular to the corresponding configurable units. Configurable units in the array of configurable units each include unit configuration load logic 3040 connected to the configuration data store 3020 via line 3022, to execute a unit configuration load process.

The unit configuration load process includes receiving, via the bus system (e.g., the vector inputs), chunks of a unit file particular to the configurable unit and loading the received chunks into the configuration data store 3020 of the configurable unit. The unit file loaded into the configuration data store 3020 can include configuration data, including opcodes and routing configuration, for circuits (e.g., module) implementing the virtualization logic 2797 in multiple functional units and multiple memory units, as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 3010 can be provided to a vector FIFO as vector inputs, and then be transferred to the configuration data store 3020. Output configuration data 3030 can be unloaded from the configuration data store 3020 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 30, a control block 3090, a daisy-chained completion bus 3091 and a daisy-chained command bus 3092 are connected to daisy-chain logic 3093, which communicates with the unit configuration load logic 3040. The daisy-chain logic 3093 can include load complete status logic, as described below. The daisy-chained completion bus is further described below. Other topologies for the command and completion buses are clearly possible but not described here.

The kernel implementations of the operations (e.g., matrix multiplication, binary addition, etc.) differ based on the characteristics of the target architecture (e.g., CPUs, GPUs, FPGAs, CGRAs, ASICs). For example, the SIMD width of vector instructions may differ across CPUs (128 bits), GPUs (64 bits), and CGRAs (32 bits), and thus the desired alignment may change. Since FPGAs and ASICs have more room to implement custom hardware, the width of SIMD operations on these architectures varies more, and thus the space of desired alignments on these architectures is generally also larger. As a result, the memory layout functions disclosed herein differ based on the target architecture. The number and specifics of the heuristics disclosed herein may also differ depending on the target architecture. For example, complicated vector orderings may be less advantageous depending on the relative cost of addressing logic in a given architecture. Other parts of the layout determination algorithm disclosed herein remain the same because the system takes the architecture into account by taking per-operation layout functions.

In one implementation, the CGRA is used as an offload accelerator in the context of a larger program. That larger program generally includes loading data from the file system of the host but may include other operations depending on what the user and/or the compiler has chosen to offload to the CGRA. In such an implementation, we assume that the host and its file system do not know about memory layouts, and therefore the host memory layout can be restricted to, for example, R/{R}/{R:1}, i.e., a row-major layout. Accordingly, a need arises to make memory layout conversions compatible between the host-specific memory layout and the respective memory layouts of the different target architectures (e.g., CPUs, GPUs, FPGAs, CGRAs, ASICs).

In another implementation, the layout determination algorithm selects those tensors that interface with the host and converts them to the host-specific memory layout (e.g., R/{R}/{R:1}).

In yet another implementation, the layout determination algorithm executes over the host code and allows for alternative layouts to reach and be supported by the file system of the host.

In implementations when the layout determination algorithm needs to generate memory layouts that are compatible with an FPGA, GPU, or ASIC and use thereof as an offload engine, the algorithm uses one of the implementations discussed above to make the host system's layouts compatible with that of the underlying offload engine (accelerator). In the implementation with the layout conversion functions, the layout conversions are done accordingly to implementations discussed above.

The situation is also similar when targeting CPUs. Depending on the scope of the program that the compiler controls and the flexibility of layouts of the inputs and outputs of the program, we can choose either to have (1) layout conversion functions for part of the program, or (2) require the functions to be explicit by forcing R/{R}/{R:1} at the boundaries, or (3) if the program reaches the file system operations of the host and we allow other memory layouts for our inputs/outputs, use the layout determination algorithm to determine the memory layouts of the entire program. This assumes that the compiler knows which layouts are supported/valid by the program's data producers and consumers. In some implementations, R/{R}/{R:1} can be used as the default memory layout for tensors that reach the file system of the host.

FIG. 31 is a block diagram illustrating an example configurable unit 3100, such as a Pattern Memory Unit (PMU), which is configured with the virtualization logic 2797 (i.e., ready-to-read credit counters, write credit counters, and flow control logic for operating them). A PMU can contain scratchpad memory 3130 coupled with a reconfigurable scalar data path 3120 intended for address calculation (RA, WA) and control (WE, RE) of the scratchpad memory 3130, along with the bus interfaces used in the PCU (FIG. 11).

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g., 3131, 3132, 3133, 3134). Banking and buffering logic 3135 for the SRAM banks in the scratchpad can be configured to operate in several banking modes to support various access patterns. A computation unit as described herein can include a lookup table stored in the scratchpad memory 3130, from a configuration file or from other sources. In a computation unit as described herein, the scalar data path 3120 can translate a section of a raw input value I for addressing lookup tables implementing a function f(I), into the addressing format utilized by the SRAM scratchpad memory 3130, adding appropriate offsets and so on, to read the entries of the lookup table stored in the scratchpad memory 3130 using the sections of the input value I. Each PMU can include write address calculation logic and read address calculation logic that provide write address WA, write enable WE, read address RA and read enable RE to the banking buffering logic 3135. Based on the state of the local FIFOs 3111 and 3112 and external control inputs, the control block 3115 can be configured to trigger the write address computation, read address computation, or both, by enabling the appropriate counters 3116. A programmable counter chain 3116 (Control Inputs, Control Outputs) and control block 3115 can trigger PMU execution.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Figure 32:
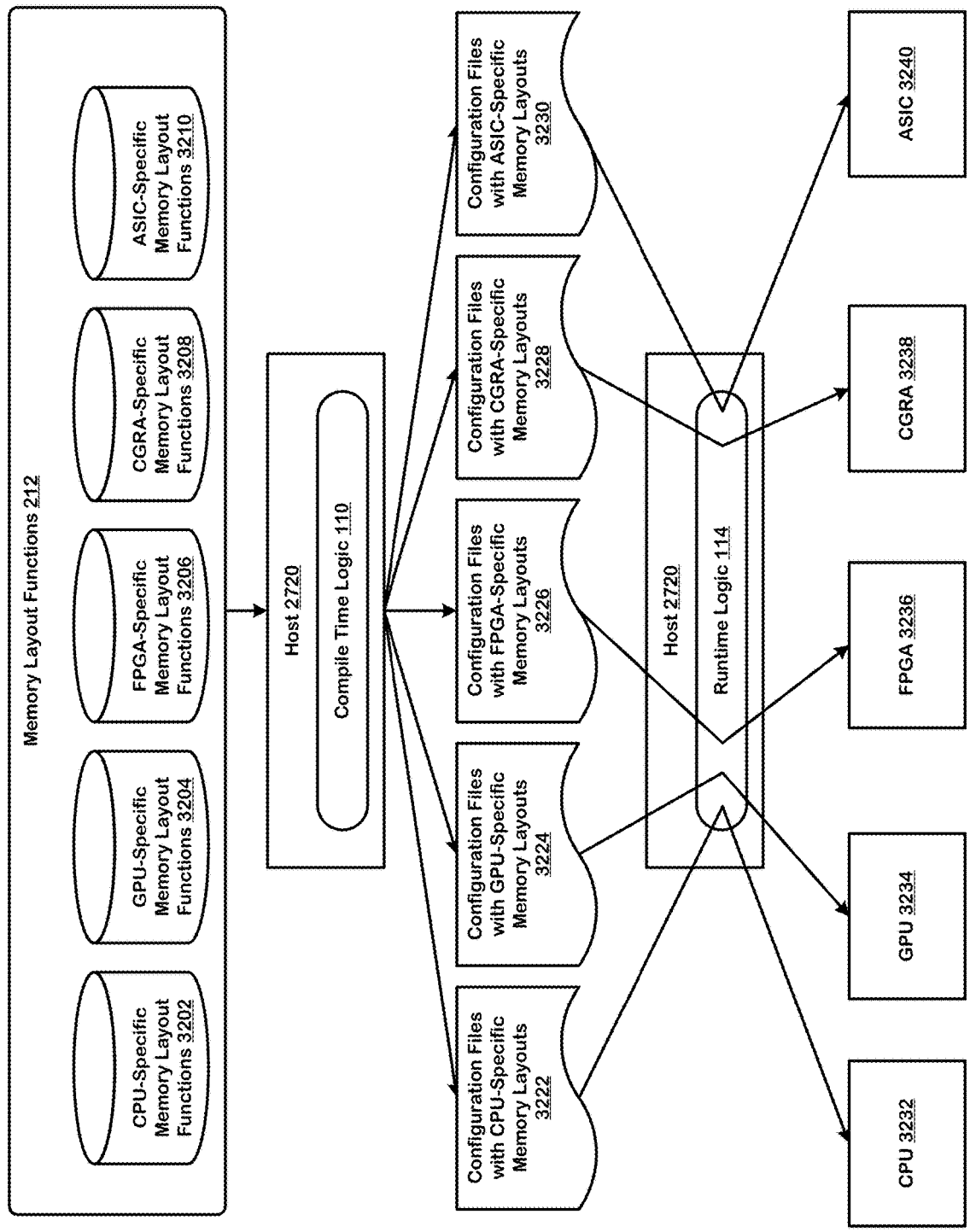
FIG. 32 shows one implementation of the compile time logic using processor-specific memory layout functions to generate processor-specific memory layouts.

FIG. 32 shows one implementation of the compile time logic 110 using processor-specific memory layout functions to generate processor-specific memory layouts. The compile time logic 110 runs in the host 2720. The host 2720 has access to processor-specific memory layout functions such as CPU-specific memory layout functions 3202, GPU-specific memory layout functions 3204, FPGA-specific memory layout functions 3206, CGRA-specific memory layout functions 3208, and ASIC-specific memory layout functions 3210.

When the underlying processor is a CPU 3232 onto which an application is to be mapped and executed, then the compile time logic 110 uses the CPU-specific memory layout functions 3202 to generate a configuration file with CPU-specific memory layouts 3222. The runtime logic 114 then loads the configuration file with the CPU-specific memory layouts 3222 on the CPU 3232.

When the underlying processor is a GPU 3234 onto which an application is to be mapped and executed, then the compile time logic 110 uses the GPU-specific memory layout functions 3204 to generate a configuration file with GPU-specific memory layouts 3224. The runtime logic 114 then loads the configuration file with the GPU-specific memory layouts 3224 on the GPU 3234.

When the underlying processor is a FPGA 3236 onto which an application is to be mapped and executed, then the compile time logic 110 uses the FPGA-specific memory layout functions 3206 to generate a configuration file with FPGA-specific memory layouts 3226. The runtime logic 114 then loads the configuration file with the FPGA-specific memory layouts 3226 on the FPGA 3236.

When the underlying processor is a CGRA 3238 onto which an application is to be mapped and executed, then the compile time logic 110 uses the CGRA-specific memory layout functions 3208 to generate a configuration file with CGRA-specific memory layouts 3228. The runtime logic 114 then loads the configuration file with the CGRA-specific memory layouts 3228 on the CGRA 3238.

When the underlying processor is an ASIC 3240 onto which an application is to be mapped and executed, then the compile time logic 110 uses the ASIC-specific memory layout functions 3210 to generate a configuration file with ASIC-specific memory layouts 3230. The runtime logic 114 then loads the configuration file with the ASIC-specific memory layouts 3230 on the ASIC 3240.

Figure 33:
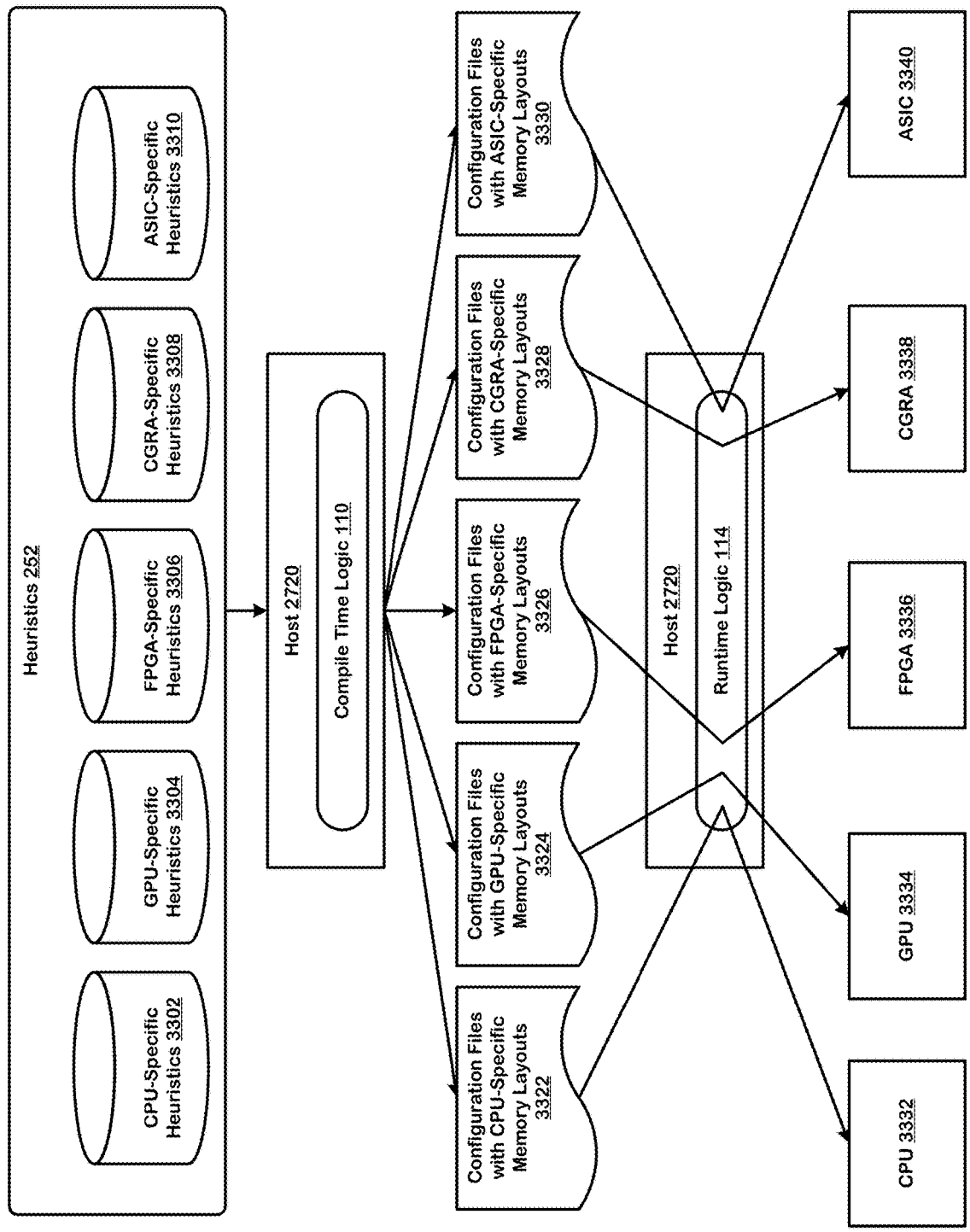
FIG. 33 shows one implementation of the compile time logic using processor-specific heuristics to generate processor-specific memory layouts.

FIG. 33 shows one implementation of the compile time logic 110 using processor-specific heuristics to generate processor-specific memory layouts. The compile time logic 110 runs in the host 2720. The host 2720 has access to processor-specific heuristics such as CPU-specific heuristics 3302, GPU-specific heuristics 3304, FPGA-specific heuristics 3306, CGRA-specific heuristics 3308, and ASIC-specific heuristics 3310.

When the underlying processor is a CPU 3332 onto which an application is to be mapped and executed, then the compile time logic 110 uses the CPU-specific heuristics 3302 to generate a configuration file with CPU-specific memory layouts 3322. The runtime logic 114 then loads the configuration file with the CPU-specific memory layouts 3322 on the CPU 3332.

When the underlying processor is a GPU 3334 onto which an application is to be mapped and executed, then the compile time logic 110 uses the GPU-specific heuristics 3304 to generate a configuration file with GPU-specific memory layouts 3324. The runtime logic 114 then loads the configuration file with the GPU-specific memory layouts 3324 on the GPU 3334.

When the underlying processor is a FPGA 3336 onto which an application is to be mapped and executed, then the compile time logic 110 uses the FPGA-specific heuristics 3306 to generate a configuration file with FPGA-specific memory layouts 3326. The runtime logic 114 then loads the configuration file with the FPGA-specific memory layouts 3326 on the FPGA 3336.

When the underlying processor is a CGRA 3338 onto which an application is to be mapped and executed, then the compile time logic 110 uses the CGRA-specific heuristics 3308 to generate a configuration file with CGRA-specific memory layouts 3328. The runtime logic 114 then loads the configuration file with the CGRA-specific memory layouts 3328 on the CGRA 3338.

When the underlying processor is an ASIC 3340 onto which an application is to be mapped and executed, then the compile time logic 110 uses the ASIC-specific heuristics 3310 to generate a configuration file with ASIC-specific memory layouts 3330. The runtime logic 114 then loads the configuration file with the ASIC-specific memory layouts 3330 on the ASIC 3340.

Figure 34:
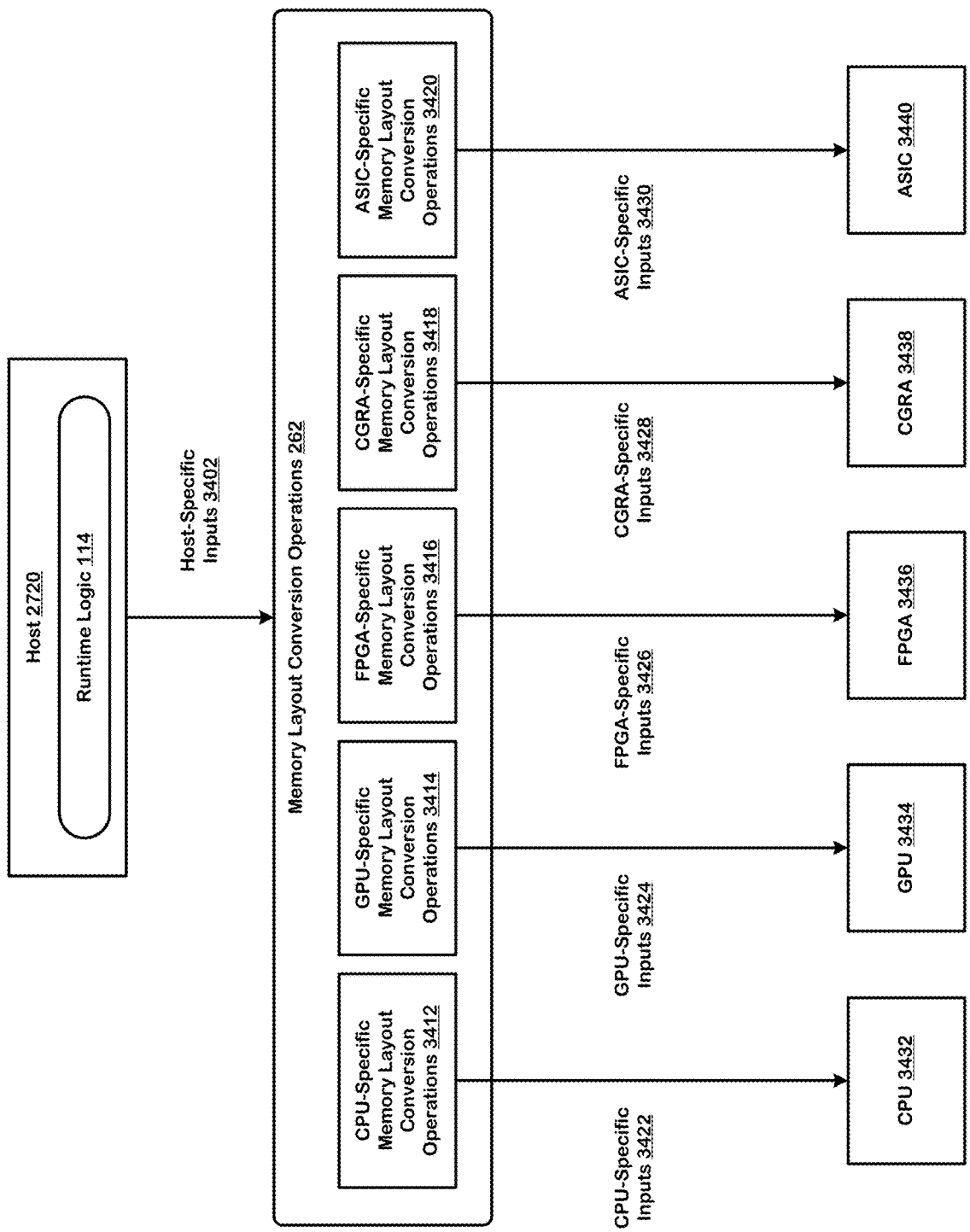
FIG. 34 shows one implementation of the runtime logic using processor-specific memory layout conversion operations to generate processor-specific inputs.

FIG. 34 shows one implementation of the runtime logic 114 using processor-specific memory layout conversion operations to generate processor-specific inputs. The runtime logic 114 runs in the host 2720. The host 2720 has access to processor-specific memory layout conversion operations such as CPU-specific memory layout conversion operations 3412, GPU-specific memory layout conversion operations 3414, FPGA-specific memory layout conversion operations 3416, CGRA-specific memory layout conversion operations 3418, and ASIC-specific memory layout conversion operations 3420.

When the underlying processor is a CPU 3432 onto which an application is to be mapped and executed, then the runtime logic 114 uses the CPU-specific memory layout conversion operations 3412 to convert host-specific inputs 3402 into CPU-specific inputs 3422. The runtime logic 114 then loads the CPU-specific inputs 3422 on the CPU 3432.

When the underlying processor is a GPU 3434 onto which an application is to be mapped and executed, then the runtime logic 114 uses the GPU-specific memory layout conversion operations 3414 to convert the host-specific inputs 3402 into GPU-specific inputs 3424. The runtime logic 114 then loads the GPU-specific inputs 3424 on the GPU 3434.

When the underlying processor is a FPGA 3436 onto which an application is to be mapped and executed, then the runtime logic 114 uses the FPGA-specific memory layout conversion operations 3416 to convert the host-specific inputs 3402 into FPGA-specific inputs 3426. The runtime logic 114 then loads the FPGA-specific inputs 3426 on the FPGA 3436.

When the underlying processor is a CGRA 3438 onto which an application is to be mapped and executed, then the runtime logic 114 uses the CGRA-specific memory layout conversion operations 3418 to convert the host-specific inputs 3402 into CGRA-specific inputs 3428. The runtime logic 114 then loads the CGRA-specific inputs 3428 on the CGRA 3438.

When the underlying processor is an ASIC 3440 onto which an application is to be mapped and executed, then the runtime logic 114 uses the ASIC-specific memory layout conversion operations 3420 to convert the host-specific inputs 3402 into ASIC-specific inputs 3430. The runtime logic 114 then loads the ASIC-specific inputs 3430 on the ASIC 3440.

Figure 35:
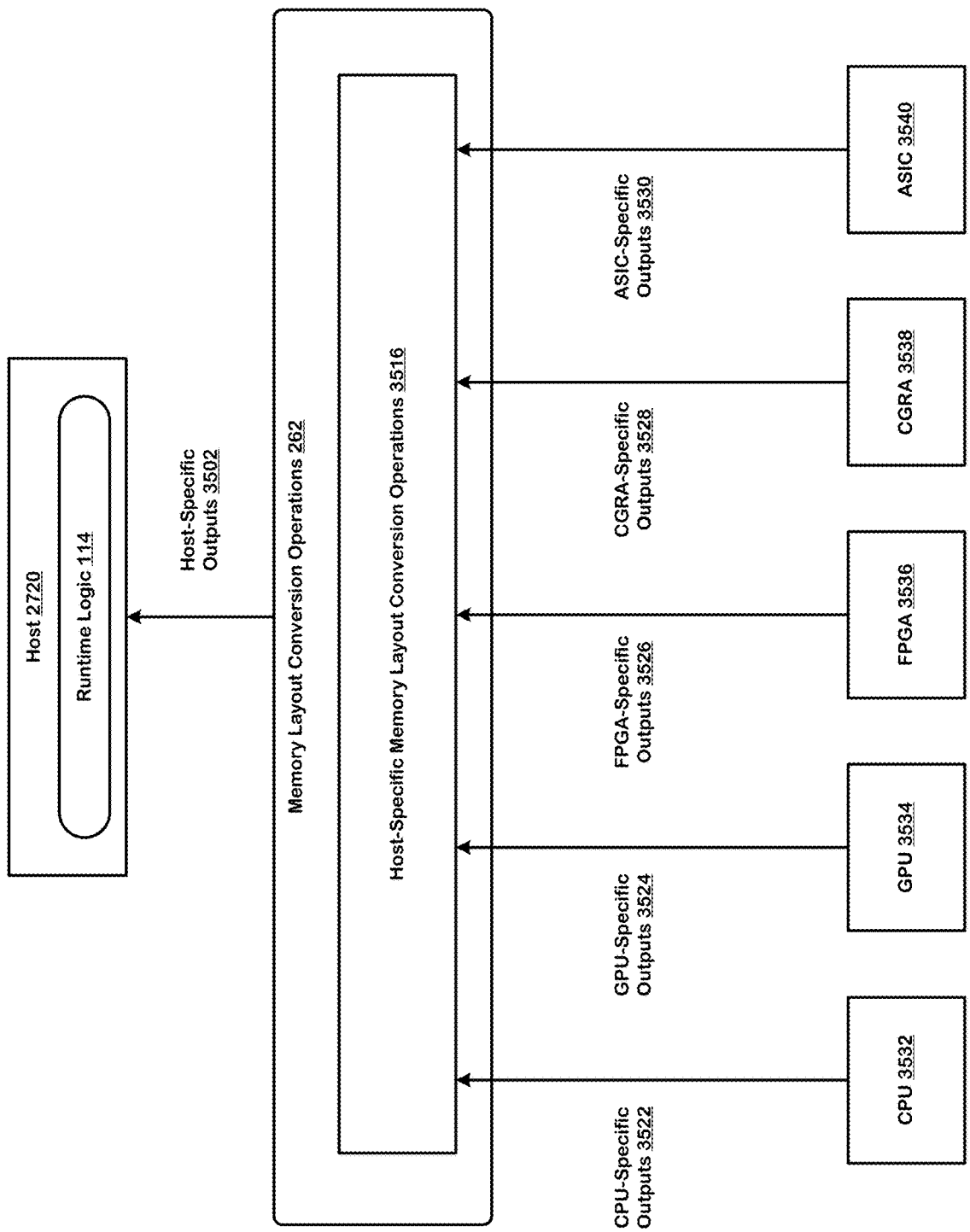
FIG. 35 shows one implementation of the runtime logic using host-specific memory layout conversion operations to convert processor-specific outputs into host-specific outputs.

FIG. 35 shows one implementation of the runtime logic 114 using host-specific memory layout conversion operations to convert processor-specific outputs into host-specific outputs 3502. The runtime logic 114 runs in the host 2720. The host 2720 has access to host-specific memory layout conversion operations 3516.

When the underlying processor is a CPU 3532 that generates CPU-specific outputs 3522 as a resulting of mapping and executing an application, then the runtime logic 114 uses the host-specific memory layout conversion operations 3516 to convert the CPU-specific outputs 3522 into the host-specific outputs 3502. The runtime logic 114 then loads the host-specific outputs 3502 on the host 2720.

When the underlying processor is a GPU 3534 that generates GPU-specific outputs 3524 as a resulting of mapping and executing an application, then the runtime logic 114 uses the host-specific memory layout conversion operations 3516 to convert the GPU-specific outputs 3524 into the host-specific outputs 3502. The runtime logic 114 then loads the host-specific outputs 3502 on the host 2720.

When the underlying processor is a FPGA 3536 that generates FPGA-specific outputs 3526 as a resulting of mapping and executing an application, then the runtime logic 114 uses the host-specific memory layout conversion operations 3516 to convert the FPGA-specific outputs 3526 into the host-specific outputs 3502. The runtime logic 114 then loads the host-specific outputs 3502 on the host 2720.

When the underlying processor is a CGRA 3538 that generates CGRA-specific outputs 3528 as a resulting of mapping and executing an application, then the runtime logic 114 uses the host-specific memory layout conversion operations 3516 to convert the CGRA-specific outputs 3528 into the host-specific outputs 3502. The runtime logic 114 then loads the host-specific outputs 3502 on the host 2720.

When the underlying processor is an ASIC 3540 that generates ASIC-specific outputs 3530 as a resulting of mapping and executing an application, then the runtime logic 114 uses the host-specific memory layout conversion operations 3516 to convert the ASIC-specific outputs 3530 into the host-specific outputs 3502. The runtime logic 114 then loads the host-specific outputs 3502 on the host 2720.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A system, comprising:
memory storing a dataflow graph for an application, the dataflow graph including producer operation units that produce tensors during execution of the application, and consumer operation units that consume the tensors during execution of the application; and
compile time logic, including a processor having access to the memory, configured to process the dataflow graph to
determine, for the tensors, expected producer memory layouts, expected consumer memory layouts, and current memory layouts,
wherein the expected producer memory layouts specify memory layouts required by the producer operation units that produce the tensors,
wherein the expected consumer memory layouts specify the memory layouts required by the consumer operation units that consume the tensors,
wherein the current memory layouts specify the memory layouts of the tensors, and
wherein each of the memory layouts includes a vector dimension and at least one of a vector ordering and a data alignment; and
store the expected producer memory layouts, the expected consumer memory layouts, and the current memory layouts in the memory for use in processing the tensors through the dataflow graph.

2. The system of claim 1, wherein the memory stores memory layout functions that generate the expected producer memory layouts and the expected consumer memory layouts based on operation types implemented by the producer operation units and the consumer operation units, respectively.

3. The system of claim 2, wherein the compile time logic is further configured to
process the dataflow graph in a forward traversal, starting from a first operation unit of the dataflow graph and progressing to successive operation units of the dataflow graph, to determine
the expected producer memory layouts using the memory layout functions, and
the current memory layouts based on the expected producer memory layouts; and
reprocess the dataflow graph in a backward traversal, starting from a last operation unit of the dataflow graph and progressing to preceding operation units of the dataflow graph, to determine
the expected consumer memory layouts using the memory layout functions, and
redetermine the current memory layouts based on the expected consumer memory layouts.

4. The system of claim 3, wherein the compile time logic is further configured to determine the current memory layouts based on a redetermination in a prior backward traversal.

5. The system of claim 3, wherein the compile time logic is further configured to determine the current memory layouts based on a determination in a prior forward traversal.

6. The system of claim 3, wherein the compile time logic is further configured to redetermine the current memory layouts based on a majority vote between a plurality of the expected consumer memory layouts.

7. The system of claim 3, wherein the compile time logic is further configured to iterate the processing and the reprocessing of the dataflow graph until convergence, wherein the convergence occurs when the expected producer memory layouts and the expected consumer memory layouts remain constant between iterations.

8. The system of claim 7, wherein, upon the convergence, the compile time logic is further configured to further process the dataflow graph to detect undefined instances of the current memory layouts.

9. The system of claim 8, wherein, the compile time logic is further configured to use a set of heuristics to assign the memory layouts to the undefined instances of the current memory layouts, wherein heuristics in the set of heuristics are based on tensor rank.

10. The system of claim 9, wherein, upon the convergence, the compile time logic is further configured to detect a memory layout conflict, and to resolve the memory layout conflict by using memory layout conversion operations.

11. The system of claim 10, wherein the compile time logic is further configured to detect the memory layout conflict when the expected consumer memory layouts are different from corresponding ones of the expected producer memory layouts, and to resolve the memory layout conflict by modifying the dataflow graph to cause the expected consumer memory layouts to match the corresponding ones of the expected producer memory layouts.

12. The system of claim 10, wherein the compile time logic is further configured to detect the memory layout conflict when the expected consumer memory layouts are different from corresponding ones of the current memory layouts, and to resolve the memory layout conflict by modifying the dataflow graph to cause the expected consumer memory layouts to match the corresponding ones of the current memory layouts.

13. The system of claim 12, wherein the memory layout conversion operations include a transpose operation that modifies the current memory layouts by changing the vector dimension of corresponding ones of the tensors.

14. The system of claim 12, wherein the memory layout conversion operations include a shuffle operation that modifies the current memory layouts by changing the vector ordering of the corresponding ones of the tensors.

15. The system of claim 12, wherein the memory layout conversion operations include a realignment operation that modifies the current memory layouts by changing the data alignment of the corresponding ones of the tensors.

16. The system of claim 10, wherein, upon the convergence, the compile time logic is further configured to detect multiple instances of the memory layout conflict, and to resolve the multiple instances of the memory layout conflict by using the memory layout conversion operations.

17. The system of claim 10, wherein the compile time logic is further configured to insert, in the dataflow graph, new operation units that implement the memory layout conversion operations, and to generate an updated version of the dataflow graph.

18. The system of claim 17, wherein the compile time logic is further configured to iterate the processing and the reprocessing of the updated version of the dataflow graph as long as the undefined instances of the current memory layouts and the memory layout conflict are detected.

19. The system of claim 1, the compile time logic further configured to generate a configuration file with configuration data for the operation units, wherein the configuration file, when loaded onto an array of configurable units, causes the array of configurable units to implement the dataflow graph using the expected producer memory layouts, the expected consumer memory layouts, and the current memory layouts in the memory for use in processing the tensors through the dataflow graph.

20. A computer-implemented method, including:
- storing a dataflow graph for an application, the dataflow graph including producer operation units that produce tensors during execution of the application, and consumer operation units that consume the tensors during execution of the application;
- processing the dataflow graph, using a processor, to determine, for the tensors, expected producer memory layouts, expected consumer memory layouts, and current memory layouts,
- wherein the expected producer memory layouts specify memory layouts required by the producer operation units that produce the tensors,
- wherein the expected consumer memory layouts specify the memory layouts required by the consumer operation units that consume the tensors,
- wherein the current memory layouts specify the memory layouts of the tensors, and
- wherein each of the memory layouts includes a vector dimension and at least one of a vector ordering and a data alignment; and
- storing the expected producer memory layouts, the expected consumer memory layouts, and the current memory layouts for use in processing the tensors through the dataflow graph.

21. A non-transitory computer readable storage medium impressed with computer program instructions, the instructions, when executed on a processor, implement a method comprising:
- storing a dataflow graph for an application, the dataflow graph including producer operation units that produce tensors during execution of the application, and consumer operation units that consume the tensors during execution of the application;
- processing the dataflow graph, using a processor, to determine, for the tensors, expected producer memory layouts, expected consumer memory layouts, and current memory layouts,
- wherein the expected producer memory layouts specify memory layouts required by the producer operation units that produce the tensors,
- wherein the expected consumer memory layouts specify the memory layouts required by the consumer operation units that consume the tensors,
- wherein the current memory layouts specify the memory layouts of the tensors, and
- wherein each of the memory layouts includes a vector dimension and at least one of a vector ordering and a data alignment; and
- storing the expected producer memory layouts, the expected consumer memory layouts, and the current memory layouts for use in processing the tensors through the dataflow graph.

* * * * *